United States Patent
Kazmi et al.

(10) Patent No.: US 9,474,010 B2
(45) Date of Patent: Oct. 18, 2016

(54) POSITIONING IN A SHARED CELL

(71) Applicant: Telefonaktiebolaget L M Ericsson (publ), Stockholm (SE)

(72) Inventors: Muhammad Kazmi, Bromma (SE); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 38 days.

(21) Appl. No.: 14/401,968

(22) PCT Filed: Aug. 22, 2014

(86) PCT No.: PCT/SE2014/050960
§ 371 (c)(1),
(2) Date: Nov. 18, 2014

(87) PCT Pub. No.: WO2015/026287
PCT Pub. Date: Feb. 26, 2015

(65) Prior Publication Data
US 2015/0312840 A1  Oct. 29, 2015

Related U.S. Application Data

(60) Provisional application No. 61/868,987, filed on Aug. 22, 2013.

(51) Int. Cl.
*H04W 40/24* (2009.01)
*H04W 36/32* (2009.01)
(Continued)

(52) U.S. Cl.
CPC ............ *H04W 40/244* (2013.01); *H04W 4/02* (2013.01); *H04W 36/32* (2013.01); *H04W 64/00* (2013.01); *H04W 88/02* (2013.01); *H04W 88/08* (2013.01)

(58) Field of Classification Search
None
See application file for complete search history.

(56) References Cited

U.S. PATENT DOCUMENTS

2013/0003572 A1* 1/2013 Kim ................ H04W 64/00
370/252
2013/0095831 A1  4/2013 Lee et al.
(Continued)

FOREIGN PATENT DOCUMENTS

EP  2051547 A1  4/2009
WO  2013048210 A1  4/2013
WO  2015023224 A2  2/2015

OTHER PUBLICATIONS

Huawei, et al., "New SI proposal: Positioning enhancements for E-UTRA", 3GPP TSG-RAN meeting #60, Oranjestad, Aruba, Jun. 11, 2013, pp. 1-5, RP-130680, 3GPP.
(Continued)

*Primary Examiner* — Erika Washington
(74) *Attorney, Agent, or Firm* — Coats & Bennett, PLLC

(57) ABSTRACT

A method is implemented by a node in a wireless communication system (10). The method includes obtaining (110) the results of one or more first radio measurements performed on one or more first radio signals transmitted or received by geographically separated transmission points, TPs, (20) of a shared cell. The method also includes determining (120), using the obtained results and from among the TPs (20) that transmit second radio signals based on the same cell identity, the particular TP (20) that transmits the second radio signal on which a positioning measurement is performed for determining a target wireless communication device's position. The method finally entails using (130) information related to the determined TP (20) to perform one or more positioning tasks.

47 Claims, 10 Drawing Sheets

(51) Int. Cl.
*H04W 4/02* (2009.01)
*H04W 64/00* (2009.01)
*H04W 88/02* (2009.01)
*H04W 88/08* (2009.01)

(56) References Cited

U.S. PATENT DOCUMENTS

2014/0200009 A1* 7/2014 Schier .................. H04W 64/00
455/446

2014/0235273 A1 8/2014 Ahn et al.

OTHER PUBLICATIONS

Research in Motion et al., "PRACH Enhancement and UL Power Control for CoMP Scenario 4", 3GPP TSG RAN WG1 Meeting #66, Aug. 22-26, 2011, pp. 1-6, Athens, Greece, R1-112372.
NTT DoCoMo, "CoMP with Lower Tx Power RRH in Heterogeneous Network", 3GPP TSG-RAN WG1 #64, Feb. 21-25, 2011, pp. 1-8, Taipei, Taiwan, R1-110867.

* cited by examiner

300

Determine that a positioning measurement for determining the position of a target wireless communication device has been or is to be performed in a shared cell on one of multiple second radio signals that geographically separated TPs of the shared cell transmit based on the same cell identity
310

Responsive to this determination, trigger a procedure that uses the results of one or more first radio measurements to determine the particular TP that transmits the second radio signal on which the positioning measurement has been or is to be performed, the one or more first radio measurements performed on one or more first radio signals transmitted or received by the TPs
320

Obtain an identity of the particular TP and/or the results of the one or more first radio measurements
330

Perform one or more positioning tasks based on the obtained identity and/or results
340

FIG. 5

POSITIONING IN A SHARED CELL

RELATED APPLICATIONS

The present application claims benefit of U.S. Provisional Application No. 61/868,987, filed 22 Aug. 2013, the disclosure of which is incorporated herein by reference in its entirety.

TECHNICAL FIELD

The present application relates generally to method and apparatus in a wireless communication system, and specifically to method and apparatus associated with performing positioning measurements in a shared cell of the system.

BACKGROUND

In a wireless communication system, a so-called measuring node performs one or more positioning measurements that are used to determine the position of a target device. A measuring node may be the target device itself, a separate radio node (i.e., a standalone node), a serving and/or neighboring node of the target device, etc. A measuring node may perform a positioning measurement on one or more downlink signals and/or one or more uplink signals. For example, in at least some scenarios, such as where the target device's serving base station functions as a measuring node, the measuring node may perform a positioning measurement on a downlink signal that the measuring node transmits to the target device and/or on an uplink signal that the measuring node receives from the target device.

Consider for instance the enhanced cell identity (E-CID) positioning method in Long Term Evolution (LTE) systems. This method determines the target device's position using at least the cell ID of a serving and/or a neighboring cell of the target device, as well as at least one positioning measurement. Various types of positioning measurements can be used for E-CID, including for instance power measurements, signal quality measurements, pathloss measurements, angle of arrival measurements, and/or timing measurements. For example, to perform a timing measurement referred to as an "eNB Rx-Tx" time difference measurement, the base station controlling the target device's serving cell 77 functions as the measuring node by measuring the difference between (i) the time when the serving cell sends a downlink signal to the target device; and (ii) the time when the serving cell thereafter receives an uplink signal from the target device. Similarly, to perform a timing measurement referred to as a "UE Rx-TX" time difference measurement, the target device itself functions as the measuring node by measuring the difference between (i) the time when the target device sends an uplink signal to the serving cell; and (ii) the time when the target device thereafter receives a downlink signal from the serving cell.

Regardless of the particular type of positioning measurement(s) performed, measurement(s) performed on a downlink signal are performed on a reference signal (e.g., a cell-specific reference signal, CRS, in LTE), a synchronization signal, a pilot channel, or any other known radio signal. Downlink radio signals transmitted from different cells in this context are distinguished from one another by the different cells' identities. In LTE, for instance, downlink radio signals transmitted from different cells are transmitted based on respective physical cell identities (PCIs). This means that positioning measurements performed on downlink signals from different cells are likewise distinguished from one another by the cell identities respectively associated with those measurements. For example, in approaches where a positioning node (e.g., E-SMLC) determines the target device's position rather than the target device itself determining its position, the target device reports the results of a positioning measurement performed on a downlink signal by indicating the identity of the cell on which that measurement was performed.

Shared cells introduce complexities to positioning. A shared cell is a type of downlink (DL) coordinated multipoint (CoMP) where multiple geographically separated transmission points (TPs) dynamically coordinate their downlink transmissions. For example, a shared cell may include low power radio resource heads (RRHs) within a macro cell's coverage, where the transmission/reception points created by the RRHs have the same cell IDs as that of the macro cell. A TP may comprise one or more antenna ports, and TP identification may in some examples comprise an identification of its antenna or antenna port. Regardless, the unique feature of a shared cell (at least in an LTE context) is that all TPs within the shared cell have the same physical cell ID (PCI). This, coupled with tight synchronization in terms of transmission timings between the TPs within a shared cell, enables the physical signals and channels transmitted from the TPs to be combined over the air. This combining increases the average received signal strength, leading to improved coverage of synchronization and control channels.

SUMMARY

Although a shared cell improves the coverage of synchronization and control channels, positioning in such a shared cell proves complicated with conventional approaches. Because the shared cell's transmission points (TPs) share the same cell identity, at least certain radio signals transmitted by the TPs cannot be distinguished from one another based on cell identity. This means that a positioning measurement performed on a downlink radio signal transmitted based on the shared cell's identity will not really be associated with the particular TP which actually transmitted that signal. This will in turn induce large positioning inaccuracy depending upon the size (e.g., radius) of the shared cell.

One or more embodiments herein improve positioning in a shared cell as compared to conventional approaches by using the results of one or more other radio measurements to determine the particular TP that transmits the radio signal on which a particular positioning measurement is performed. That is, the one or more embodiments advantageously exploit the results of one or more other radio measurements, rather than simply a cell identity, to distinguish the particular TP on which a positioning measurement is performed.

More particularly, one embodiment herein includes a method implemented by a node in a wireless communication system. The method includes obtaining the results of one or more first radio measurements performed on one or more first radio signals transmitted or received by geographically separated TPs of a shared cell. The method also entails determining, using the obtained results and from among the TPs that transmit second radio signals based on the same cell identity, the particular TP that transmits the second radio signal on which a positioning measurement is performed for determining a target wireless communication device's position. Finally, the method includes using information related to the determined TP to perform one or more positioning tasks.

In some embodiments, the method also includes associating the same cell identity and an identity of the determined TP with an identity of the target device and/or a result of the positioning measurement. In this case, the information related to the determined TP indicates the association.

Additionally or alternatively, the one or more positioning tasks include signaling the information to another node.

In some embodiments, by contrast, the one or more positioning tasks include using the position of the determined TP and a result of the positioning measurement to determine the target device's position.

Regardless, the method in some embodiments obtains the results of different first radio measurements performed by the different TPs on at least uplink signals transmitted to the TPs. In other embodiments, however, the method obtains the results of one or more first radio measurements performed on at least TP-specific downlink radio signals transmitted by the TPs, wherein the TP-specific downlink radio signals are transmitted by the TPs based on different TP identities.

No matter whether the first radio signals are uplink or downlink signals, though, the method in some embodiments entails determining the particular TP as the TP that, as indicated by the obtained results, is closest to a particular wireless communication device, wherein the particular wireless communication device performs the positioning measurement and/or is the target device. Additionally or alternatively, this determination in one or more embodiments comprises comparing the results of the first radio measurements to one another and/or to the result of the positioning measurement.

In some embodiments, determining the particular TP comprises comparing the results of the first radio measurements to one another. In this case, the method includes determining based on that comparison the maximum, or alternatively the minimum, one of the results, and identifying said particular TP as the TP that transmitted or received the first radio signal on which the first radio measurement with the maximum or minimum result was performed.

In other embodiments, though, the method includes obtaining the result of the positioning measurement. In one such embodiment, then, the method determines the particular TP by determining which of the first radio measurements has a result that best matches with the result of the positioning measurement according to one or more defined criterions, and identifying the particular TP as the TP that transmitted or received the first radio signal on which the determined first radio measurement was performed.

As one example, the result of each of the first radio measurements indicates a position of the target device. In this case, determining the particular TP comprises determining which of the first radio measurements has a result that indicates a position of the target device most similar to that indicated by the positioning measurement.

Embodiments herein also include a method implemented by a wireless communication device in a wireless communication system. The method includes performing a positioning measurement on one of multiple radio signals that geographically separated TPs of a shared cell transmit based on the same cell identity. The method also entails determining the particular TP that transmits the radio signal on which the wireless communication device performs the positioning measurement. Moreover, the method includes associating an identity of the particular TP and said same cell identity with an identity of the wireless communication device and/or a result of the positioning measurement.

Determining the particular TP in some of these embodiments simply comprises receiving the identity of the particular TP from a network node. Alternatively, this determination in other embodiments comprises performing one or more radio measurements on one or more TP-specific downlink radio signals received from one or more of the TPs, and determining the particular TP using the results of those one or more radio measurements. As one example, this comprises comparing the results of radio measurements performed on multiple TP-specific downlink radio signals to one another, determining based on said comparison the maximum one of the results, and identifying said particular TP as the TP that transmitted the TP-specific downlink radio signal on which the radio measurement with said maximum result was performed.

In any event, the method performed by the device in some embodiments comprises sending information indicating the association to another node (e.g., to a radio network node or positioning node).

Embodiments herein also include another method implemented by a node in a wireless communication system. This method includes determining that a positioning measurement for determining the position of a target wireless communication device has been or is to be performed in a shared cell on one of multiple second radio signals that geographically separated TPs of the shared cell transmit based on the same cell identity. The method then entails, responsive to that determination, triggering a procedure that uses the results of one or more first radio measurements to determine the particular TP that transmits the second radio signal on which the positioning measurement has been or is to be performed. Again, these one or more first radio measurements are performed on one or more first radio signals transmitted or received by the TPs.

In some such embodiments, the method also includes obtaining an identity of the particular TP and/or the results of the one or more first radio measurements, and performing one or more positioning tasks based thereon. Such obtaining may entail for instance receiving information associating the identity of the particular TP with an identity of the target wireless communication device, or information associating both the identity of the particular TP and the same cell identity with the identity of the target wireless communication device.

In any event, the method in some embodiments triggers the procedure by sending to a radio network node controlling one of the TPs a request that the radio network node obtain the one or more first radio measurements as one or more measurements of at least uplink signals transmitted by the target wireless communication device.

In other embodiments, by contrast, the method triggers the procedure by sending the target wireless communication device a request and/or configuring the target wireless communication device to perform the positioning measurement as a measurement of downlink signals transmitted by the TPs.

In still other embodiments, the method triggers the procedure by sending to the target device and/or to a radio network node controlling one of the TPs an indication that the target device and/or the radio network node needs to determine the particular TP.

Further embodiments trigger the procedure by sending to a network node an indication that the positioning measurement involves downlink signals in a shared cell. Additionally or alternatively, embodiments herein trigger the procedure by sending to a network node an indication that the positioning measurement is particular type of measurement.

Irrespective of the particular way the procedure is trigger, the method in some embodiments determine that the positioning measurement is to be performed by receiving a request that the positioning measurement is to be performed.

In any of the above embodiments, the one or more first radio measurements may comprise one or more timing measurements. In this case, for example, the one or more first radio measurements may comprise one or more eNodeB Rx–Tx time difference measurements, one or more timing advance type 1 or type 2 measurements, or one or more propagation delay measurements in a Long Term Evolution, LTE, system.

Also in any of the above embodiments, the positioning measurement may comprise a timing measurement. In this case, for example, the positioning measurement may comprise a UE Rx-TX time difference measurement in a Long Term Evolution, LTE, system.

Still further in any of the above embodiments, the positioning measurement may be performed on a cell-specific reference signal, CRS, in a Long Term Evolution, LTE, system, wherein the TPs transmit CRS in the shared cell based on the same physical cell identity, PCI.

Finally, in any of the above embodiments, the positioning measurement may be performed for enhanced cell identity, E-CID, positioning.

In some embodiments, the measuring node that performs positioning measurement is the same as the target device whose position is determined based on those positioning measurement.

Embodiments herein further include corresponding apparatus, computer programs, carriers, and computer program products.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 5 is a logic flow diagram of a method implemented by a node according to one or more other embodiments.

DETAILED DESCRIPTION

Figure 1:
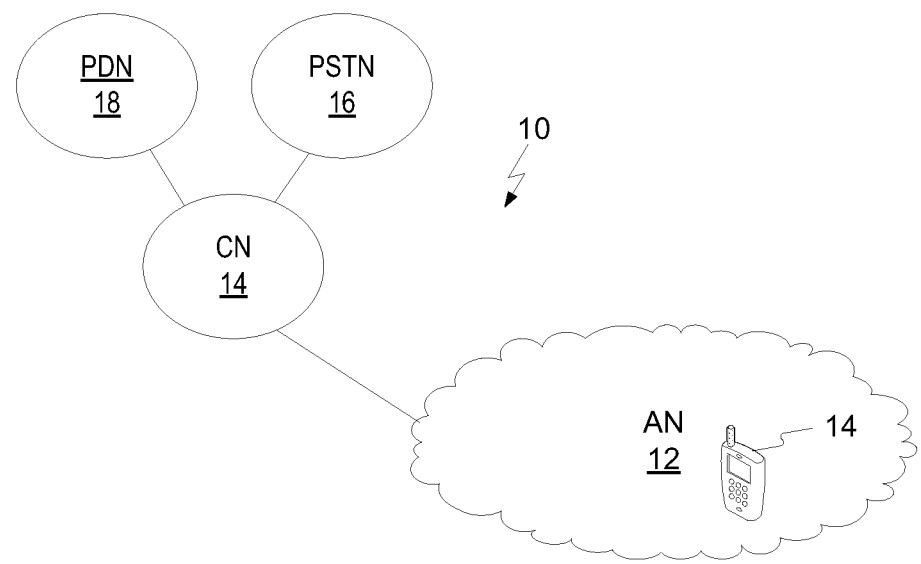
FIG. 1 is a block diagram of a wireless communication system according to one or more embodiments.

FIG. 1 illustrates a wireless communication system 10 according to one or more embodiments. The system 10 includes a wireless access network 12 that provides one or more wireless communication devices 14 access to a core network 14. The core network 14 in turn enables the device(s) 14 to access one or more external networks, such as the Public Switched Telephone Network (PSTN) 16 or a packet data network (PDN) 18, e.g., the Internet.

Figure 2:
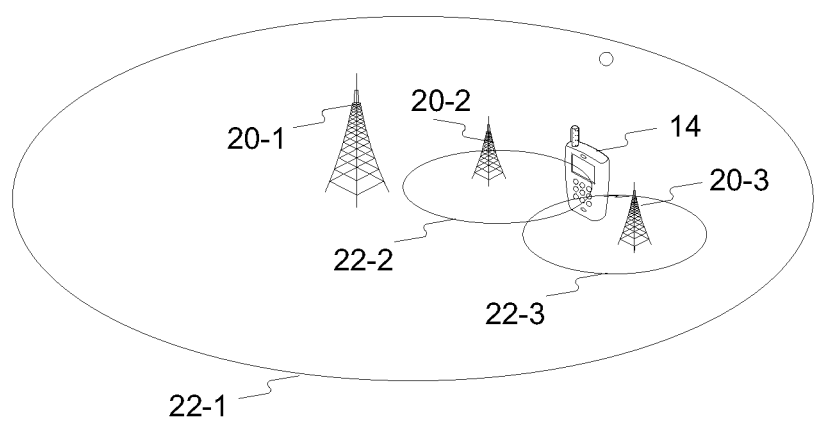
FIG. 2 is a block diagram of a shared cell according to one or more embodiments.

The access network 12 includes a number of transmission points (TPs) 20-1, 20-2, 20-3, etc. as shown in FIG. 2. Each TP 20 provides radio coverage for one or more portions of the system's geographic area, referred to as cells 22. Each TP 20 does so by transmitting one or more downlink radio signals and receiving one or more uplink radio signals in its respective cell 22. As shown in FIG. 2, for instance, TP 20-1 provides radio coverage for cell 22-1, TP 20-2 provides radio coverage for cell 22-3, and TP 20-3 provides radio coverage for cell 22-3. The cells 22 provided by at least some geographically separated TPs 20 at least partially overlap in coverage.

In this context, a so-called measuring node performs one or more positioning measurements that are used to determine the position of a target device (e.g., a particular wireless communication device 14). The measuring node and the target device may be the same node or different nodes in the system 10. For example, the target device in some embodiments is a particular wireless device 14 that performs the one or more positioning measurements itself so as to function as the measuring node; and the target device may determine its position itself or report the measurement results to a separate positioning node (e.g., an E-SMLC in an LTE system). In a different example, the target device is a particular wireless device 14 whereas the measuring node either is a radio network node (e.g. base station) controlling a TP 20 or another wireless device 14 within close proximity (e.g., device-to-device, D2D, communication range) to the target device. Where the measuring node is a wireless device 14 (whether the target device or another device), the measuring node will be referred to herein as a measuring device.

Embodiments herein focus on a positioning measurement that is performed on a downlink radio signal. As used herein, this does not limit the positioning measurement to being performed only on one downlink signal or only on a signal transmitted in the downlink direction; that is, the positioning measurement may be either performed only on one or more downlink signals or performed on both one or more downlink signals and one or more uplink signals so as to be bi-directional. Accordingly, performing a measurement on a certain signal is synonymous herein with performing a measurement on at least a certain signal.

Regardless, a downlink signal on which a positioning measurement is performed comprises any signal transmitted by a TP 20 that is used for performing a positioning measurement. This includes for instance a reference signal (e.g., a cell-specific reference signal, CRS, in LTE), a synchronization signal (e.g., a primary synchronization signal, PSS, or secondary synchronization signal, SSS, in LTE), a pilot channel (e.g., a common pilot channel, CPICH, in HSPA), a synchronization channel, or any other known radio signal. The downlink signal may be dedicated for the purpose of positioning (e.g., as a positioning reference signal, PRS, in LTE) or may not be so dedicated (e.g., like a CRS in LTe).

A positioning measurement measures a certain characteristic with which a downlink signal is transmitted or received. For example, when a wireless communication device 14 performs the positioning measurement, the device 14 may measure characteristics such as the power, signal quality, pathloss, angle of arrival, or timing with which the device 14 receives a downlink signal. As another example, when a radio network node controlling a TP 20 performs the positioning measurement, the radio network node may measure characteristics such as the timing with which the node transmits a downlink signal. Regardless, the positioning measurement may also involve measuring a similar characteristic of an uplink signal, such as the case with an "eNB Rx–Tx" time difference measurement and a "UE Rx-TX" time difference measurement in Long Term Evolution (LTE) embodiments.

When a positioning measurement is performed on a downlink signal, complexities arise if the TPs' cells 22 form a so-called shared cell. The cells 22 form a shared cell when the cells 22 are identified by and thereby share the same identity, e.g., at least at the physical layer (e.g., cell-id 1). A shared cell as used herein therefore refers to the coverage area of such cells 22; that is, the coverage area of cells 22 that are provided by geographically separated TPs 20, that at least partially overlap in coverage, and that share the same cell identity (at least at the physical layer) referred to herein as the shared cell's identity. With the TPs' cells 22 sharing the same identity, the TPs 20 transmit at least some downlink signals based on the same identity. This means that a node that receives a downlink signal cannot determine the TP 20 that transmitted that signal simply by determining the cell identity used for the transmission. Similarly, a node that obtains the result of a positioning measurement performed on such a downlink signal cannot determine the TP 20 that transmitted the signal simply by determining the cell identity associated with that measurement result. With the transmitting TP 20 not being distinguishable, the positioning measurement can be said to be inherently TP-agnostic. The TP 20 that transmitted the downlink signal on which the positioning measurement is performed is of course the TP 20 that is relevant for determining the target device's position (this TP is therefore appropriately referred to herein as the "relevant TP"). For example, if a node cannot determine the TP 20 that transmitted the signal on which the positioning measurement is performed, the target device's position cannot be accurately determined based on the position of that TP 20. This is especially the case for instance where the positioning measurement's result indicates the target device's position relative to the transmitting TP's position (e.g., in the form of a timing measurement performed on one or more downlink signals transmitted to the target device). This would in turn induce large positioning inaccuracy depending upon the size (e.g., radius) of the shared cell.

Figure 3:
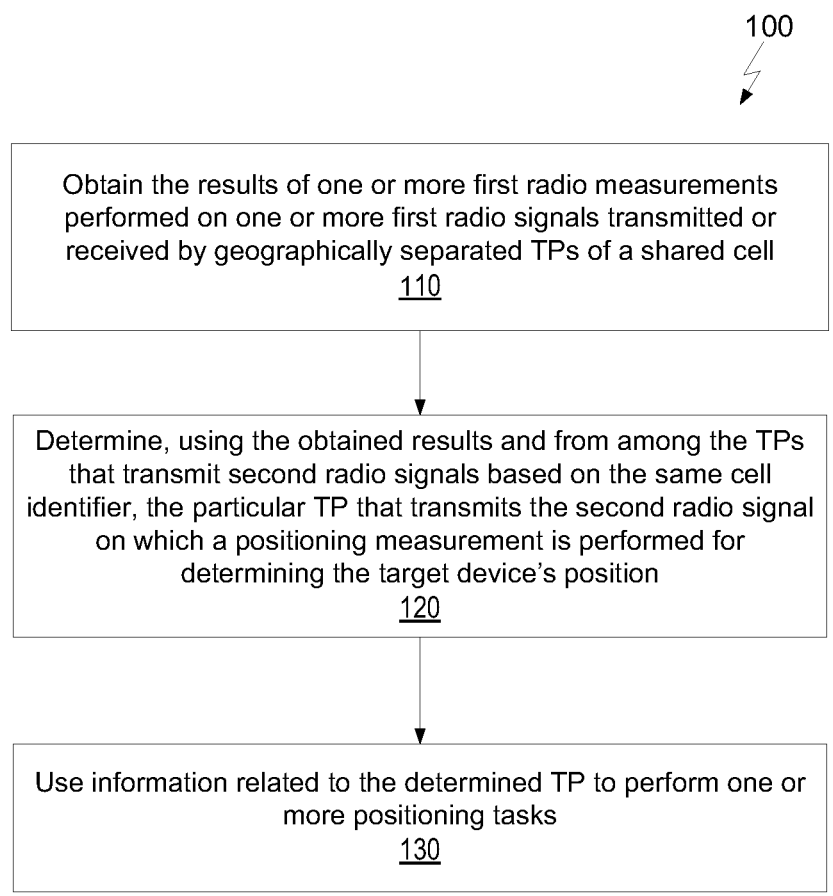
FIG. 3 is a logic flow diagram of a method implemented by a node according to one or more embodiments.

Rather than simply relying on a cell identity to determine the TP 20 that transmits the radio signal on which a positioning measurement is performed in a shared cell (i.e., the relevant TP), one or more embodiments herein advantageously determine that relevant TP 20 using the results of one or more other radio measurements. FIG. 3 illustrates a method performed according to these one or more embodiments.

As shown in FIG. 3, a method 100 is performed by a node in the wireless communication system 10. The node may be for instance the target device, the measuring node, a positioning node, or any other node. The method 100 includes obtaining the results of one or more first radio measurements performed on one or more first radio signals transmitted or received by geographically separated TPs 20 of the shared cell (Block 110). The method 100 further includes determining, using the obtained results and from among the TPs 20 that transmit second radio signals (e.g., CRS in LTE) based on the same cell identity, the particular TP 20 that transmits the second radio signal on which a positioning measurement is performed for determining a target wireless communication device's position (Block 120). Finally, the method 100 entails using information related to the determined TP 20 to perform one or more positioning tasks (Block 130).

The method 100 therefore broadly associates the positioning measurement with the particular TP 20 that transmits the signal on which the measurement is performed (i.e., the relevant TP). That is, rather than the positioning measurement not being associated with any particular TP 20 via the shared cell's identity alone, the method 100 associates that measurement with a particular TP 20 using the results of one or more other radio measurements (referred to as "first" measurements). In one or more embodiments, the method 100 even explicitly associates an identity of the determined TP 20 and the shared cell's identity with the target device's identity and/or a result of the positioning measurement. The combination of the determined TP's identity and the shared cell's identity enables any node in the system 10 to uniquely identify the determined TP (as the TP relevant to the positioning measurement).

In some embodiments, the one or more positioning tasks performed by the method 100 include actually determining the target device's position using information related to the determined TP 20. Information that proves particularly useful for determining the target device's position includes for instance the determined TP's position. In this case, then, the method 100 entails using the determined TP's position and the positioning measurement's result to determine the target device's position.

Consider for instance embodiments where the positioning measurement's result indicates the target device's position relative to the determined TP's position. One example of such a positioning measurement is a timing measurement performed on at least a downlink signal transmitted by the determined TP 20 to the target device (e.g., an eNB Rx–Tx, a UE Rx-TX, or a timing advance (TA) measurement in LTE). Such a timing measurement indicates a distance between the target device and the determined TP 20. The method 100 in one or more of these embodiments thereby involves calculating the target device's position as being within a circle that has a certain radius from the determined TP's position, where that certain distance is indicated by the positioning measurement's result. This calculation may of course be combined with other similar calculations made from other positioning measurements with respect to other TPs 20 in order to triangulate the target device's position.

In other embodiments, the one or more positioning tasks performed by the method 100 include signaling the information related to the determined TP 20 to another node, with or without that other node having requested the information. In one embodiment, for example, the signaled information indicates an association of the shared cell's identity and the determined TP's identity with the target device's identity and/or the positioning measurement's result. Such association may involve for instance labeling or tagging the target device's identity and/or the positioning measurement's result with the shard cell's identity and the determined TP's identity. Regardless, this signaling informs the other node about a unique association of the determined TP 20 with the positioning measurement itself and/or the device for which the positioning measurement is performed. In other embodiments, the signaled information additionally or alternatively indicates the position of the determined TP 20.

Regardless of what the signaled information specifically indicates, the information enables the other node to determine the target device's position based on that information as described above, or to in turn signal the information to yet another node for such determination. The other node may therefore be for instance the target device, a radio network node controlling a TP 20 of the shared cell, a radio network node controlling a TP of another shared cell, a neighboring base station, a separate positioning node (e.g., an E-SMLC), etc. Indeed, in one example, a radio network node performs method 100 and signals the information to the target device 14, which in turns forwards the information or part of it to a separate positioning node. In yet another example, the radio network node performs method 100 and signals the information to a separate positioning node, where that separate positioning node receives the positioning measurement result directly from the target device. In this latter case, the radio network node may simply send information associating the determined TP's identity and the shared cell's identity with the target device's identity. The radio network node may also send information indicating the type of positioning measurement for which the association applies and/or the determined TP's position.

Irrespective of the type of positioning task(s) performed using information related to the determined TP 20, the method 100 determines that TP 20 using the results of one or more first radio measurements performed on one or more first radio signals transmitted or received by the TPs 20 (e.g., to or from the target device 14 or another wireless device 14 within close proximity to the target device 14). In at least some embodiments, the one or more first radio measurements are performed on at least TP-specific downlink radio signals transmitted by the TPs 20. Unlike the second radio signals that the TPs transmit based on the same cell identity, the different TPs 20 in the shared cell transmit these TP-specific downlink radio signals based on different TP identities. In one or more LTE embodiments, for instance, the target device 14 performs the one or more first radio measurements as channel quality information (CQI) measurements or channel state information reference signal received power (CSI-RSRP) measurements on CSI-RS that the different TPs 20 transmit based on different TP identities. Where the second radio signals are CRS, for instance, this means that the method 100 uses the results of CQI or CSI-RSRP measurements performed on CSI-RS to unambiguously determine the TP 20 that transmits the CRS on which a positioning measurement is performed.

In other embodiments, by contrast, the one or more first radio measurements are performed by the different TPs 20 on at least uplink signals transmitted to the TPs 20. In one or more embodiments, for example, such uplink signals include sounding reference signals (SRS), demodulation reference signals (DMRS), uplink pilot signals, random access channel, etc. The first radio measurements in this case may be power measurements, signal quality measurements, pathloss measurements, angle of arrival measurements, and/or timing measurements, etc. In one particular LTE embodiment, though, the first radio measurements are eNodeB Rx-Tx time difference measurements that the TPs 20 perform on not only uplink signals transmitted to the TPs 20 but also downlink signals (e.g., CRS) transmitted by the respective TPs 20.

No matter whether the first radio signals are downlink or uplink signals, the method 100 in at least some embodiments determines the particular TP 20 by comparing the results of the first radio measurements to one another and/or to the result of the positioning measurement.

In embodiments that compare the first measurement results to the positioning measurement's result, the method 100 also appropriately entails obtaining the result of the positioning measurement. The method 100 further includes determining which of the first radio measurements has a result that best matches with the result of the positioning measurement according to one or more defined criterions. The method 100 then includes identifying the particular TP 20 that transmitted the second radio signal on which the positioning measurement was made as the TP 20 that transmitted or received the first radio signal on which the determined first radio measurement was performed.

In one embodiment, for instance, the result of each of the first radio measurements explicitly, implicitly, or inherently indicates a position of the target device 14; that is, the first radio measurements are in at least a general sense positioning measurements themselves. In this case, the method 100 entails determining which of the first radio measurements has a result that indicates a position of the target device 14 most similar to that indicated by the positioning measurement. The TP 20 which transmitted or received the first radio signal on which that first radio measurement was performed is determined to be the same TP 20 that transmits the second radio signal on which the positioning measurement is performed.

Of course, these embodiments require identifying the particular TPs 20 that transmit the first radio signals on which the first radio measurements are performed. In at least some embodiments, these TPs 20 are readily identifiable because the TPs 20 themselves perform the first radio measurements on one or more uplink signals transmitted to the TPs 20. In this case, then, the first radio measurements can be referred to as TP-specific measurements. That is, these embodiments use TP-specific first measurement results to determine the TP 20 that transmits the second radio signal on which the inherently TP-agnostic positioning measurement is performed.

In one or more LTE embodiments, for example, the TPs 20 perform first radio measurements in the form of eNodeB Rx-Tx time difference measurements, and the target device 14 performs the positioning measurement in the form of a UE Rx-TX time difference measurement. The node performing the method 100 (e.g., the radio network node controlling the serving TP 20) obtains the UE Rx-Tx time difference measurement from the target device 14 and obtains eNodeB Rx-Tx time difference measurements from TPs 20 within the shared cell. Because the node receives the eNodeB Rx-Tx measurements from the TPs 20, the node is able to identify which TPs 20 performed which of those measurements. The node then determines which eNodeB Rx-Tx time difference measurement indicates a position most similar to that indicated by the UE Rx-Tx time difference measurement. The TP 20 which performed that eNodeB Rx-Tx time difference measurement is determined to be the TP 20 which transmitted the second radio signal on which the UE Rx-Tx time difference measurement was performed.

Consider now embodiments that compare the results of the first radio measurements to one another, rather than or in addition to comparing those results to the positioning measurement result. In one or more of these embodiments, the method 100 includes determining based on that comparison the maximum, or alternatively the minimum, one of the first radio measurement results. The method 100 then identifies the particular TP 20 which transmits the second radio signal on which the positioning measurement is performed (i.e., the relevant TP) as being the TP 20 that transmitted or received the first radio signal on which the first radio measurement with the maximum or minimum result was performed.

At least some of these embodiments operate on two assumptions. As the first assumption, the particular TP 20 transmitting the signal on which the positioning measurement is performed (i.e., the relevant TP) is geographically closest to, has the highest signal quality with respect to, and/or has the most direct signal path to a particular wireless device 14; namely, a device that performs the positioning measurement (i.e., as the measuring device) and/or is the target device. The TP which has the highest signal quality and/or the most direct path in this regard is typically also the geographically closest, but this may not be the case in some multipath environments (e.g., in dispersive radio environments with lots of reflection, the first signal path may be received from a TP that is not geographically closest). In any event, as the second assumption, the maximum or minimum first measurement result reveals which TP 20 is geographically closest to, has the highest signal quality with respect to, and/or has the most direct signal path to the measuring device and/or target device. Based on these assumptions, the embodiments determine the relevant TP 20 to be the TP 20 associated with the maximum or minimum first measurement result.

For example, in one or more LTE embodiments, a measuring device (which may also be the target device) performs a UE Rx–Tx time difference measurement on whatever second radio signal the device receives first in time (i.e., whatever signal path the device detects first in time). A node (e.g., a radio network node controlling the serving TP) implements method 100 in order to determine which TP 20 transmits that first-received second radio signal (i.e., as the relevant TP). The node in this regard obtains first radio measurements in the form of eNodeB Rx–Tx time difference measurements performed by the different TPs 20. The node determines the minimum eNodeB Rx–Tx time difference measurement and identifies the relevant TP 20 as the TP 20 that performed that minimum first measurement.

In one or more other LTE embodiments, the first radio measurements are obtained in the form of CQI or CSI-RSRP measurements performed on downlink radio signals (e.g., CSI-RS) transmitted by the TPs 20. In this case, the node implementing method 100 determines the maximum CQI or CSI-RSRP measurement and identifies the relevant TP 20 as the TP 20 associated with that maximum measurement (i.e., the TP 20 that transmitted the downlink signal on which that maximum measurement was performed).

Figure 4:
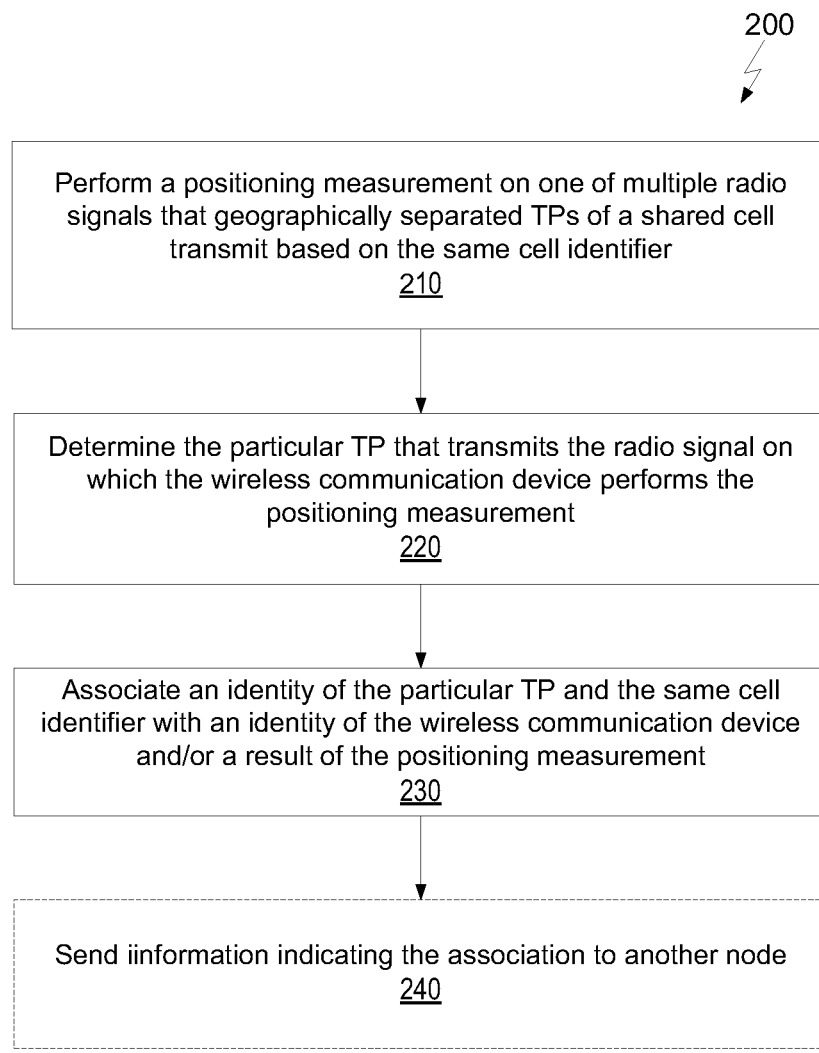
FIG. 4 is a logic flow diagram of a method implemented by a wireless communication device according to one or more embodiments.

Related and/or supporting embodiments herein also include a method 200 as shown in FIG. 4. The method 200 is performed by a wireless communication device 14, which is a measuring device. The device may also be the target device. The method 200 includes performing a positioning measurement on one of multiple radio signals (referred to above as second radio signals) that geographically separated TPs 20 of the shared cell transmit based on the same cell identity (Block 210). The method 200 further entails determining the particular TP 20 that transmits the (second) radio signal on which the device 14 performs the positioning measurement (Block 220). This determination in some embodiments entails simply receiving the particular TP's identity from a network node (e.g., a radio network node controlling a TP 20 or a separate positioning node), with or without the device 14 having requested that identity. The determination in other embodiments involves actually performing one or more (first) radio measurements on one or more TP-specific downlink radio signals as described above.

Regardless, the method 200 finally includes associating an identity of the particular TP 20 and the same cell identity with an identity of the wireless communication device 14 and/or a result of the positioning measurement (Block 230). In one or more embodiments, this associating involves tagging or labeling the device's identity and/or the positioning measurement's result with the particular TP's identity and the shared cell's identity.

In at least some embodiments, the method 200 further includes sending information indicating the association to another node (Block 240). The device 14 may for instance send the information to a separate positioning node (e.g., an E-SMLC via the LPP protocol). Alternatively, the device 14 may send the information to another device 14 within close proximity (e.g., via D2D communication).

Other related and/or supporting embodiments herein include a method 300 shown in FIG. 5. The method 300 is implemented by a node in the system 10 that triggers method 100 (which can be the target device, the measuring node, a separate positioning node, or any other node). More particularly, the method 300 includes determining that a positioning measurement for determining the target device's position has been or is to be performed in the shared cell on one of multiple second radio signals that geographically separated TPs 20 of the shared cell transmit based on the same cell identity (Block 310). The method then includes, responsive to that determination, triggering a procedure (i.e., method 100) that uses the results of one or more first radio measurements to determine the particular TP 20 that transmits the second radio signal on which the positioning measurement has been or is to be performed (Block 320). As described above, these one or more first radio measurements are performed on one or more first radio signals transmitted or received by the TPs 20.

In at least some embodiments, the method 300 further includes obtaining the particular TP's identity and/or the results of the one or more first radio measurements (Block 330). Such may involve for instance the node determining that identity itself or the node performing the first radio measurement(s) itself. Or this may simply involve receiving information associating the particular TP's with an identity of the target device, or information associating both the particular TP's identity and the shared cell's identity with the target device's identity. Regardless of how the TP's identity and/or the first measurement results are obtained, though, the method 300 in this case also entails performing one or more positioning tasks based on the identity and/or results (Block 340). A positioning task as described above for instance may include determining the target device's position or signaling to another node information associating the particular TP's identity and the shared cell's identity with an identity of the target device and/or the positioning measurement result.

The node implementing method 300 may trigger the procedure (i.e., method 100) to be performed by the node itself, or by some other node, and may do so in any number of ways. In one embodiment, for instance, the node (e.g., a separate positioning node such as an E-SMLC or the target device) triggers the procedure by sending to a radio network node controlling one of the TPs 20 and/or to the target device an indication that the radio network node and/or the target device needs to determine the particular TP. This indication may be generated by the node itself or simply received and forwarded by the node. Moreover, the indication may be explicit or implicit.

For example, the node in some embodiments triggers the procedure by simply sending an indication that the positioning measurement involves downlink signals in a shared cell. In other embodiments, the node triggers the procedure by sending an indication that the positioning measurement is a particular type of measurement (e.g., a timing measurement, a timing measurement on a downlink signal, a UE Rx-TX time difference measurement, etc.). Either way, the recipient of the indication understands that the relevant TP must be determined in this case.

In still other embodiments, the node triggers the procedure by sending to a radio network node controlling one of the TPs 20 a request that the radio network node obtain the one or more first radio measurements as one or more measurements of at least uplink signals transmitted by the target device (e.g., as uplink timing measurement(s) such as eNodeB Rx–Tx time difference, timing advance, etc.). In one or more embodiments, the radio network node is pre-configured to obtain those measurements, determine the relevant TP 20, and if needed also provide the relevant TP's identity to the triggering node (e.g., a separate positioning node). In some embodiments, of course, the node just explicitly requests that the radio network node provide the relevant TP's identity in this way.

In one or more alternative embodiments, the node triggers the procedure by sending to the target device a request and/or configuring the target device to perform the positioning measurement as a measurement of downlink signals transmitted by the TPs (e.g., as a UE Rx–Tx time difference measurement). In addition, the node may also indicate in a message to the radio network node that the target device is performing a certain type of measurement in a shared cell.

Of course, embodiments herein also include associated capability signaling whereby nodes exchange information indicating that they are capable of functioning as described above.

Those skilled in the art will appreciate that while certain embodiments herein have been described as employing one or more first radio measurements as well as a second radio measurement (i.e., a positioning measurement), the labels "first" and "second" here are simply used to distinguish the measurements from one another; they do not indicate the order in which the measurements are performed. That is, the one or more "first" measurements may be performed prior, during, or after the "second" measurement is performed.

The embodiments above have not been described in the context of any particular type of wireless communication system (i.e., RAT), except for a few particular examples. In this regard, no particular communication interface standard is necessary for practicing embodiments herein. That is, the wireless communication system 10 may be any one of a number of standardized system implementations in which a measuring node can perform positioning measurements.

Nonetheless, as one particular example, the system 10 may implement LTE or LTE-based standards. The LTE architecture explicitly supports location services by defining the Evolved Serving Mobile Location Center (E-SMLC) that is connected to the core network (i.e. Mobility Management Entity (MME)) via the so called LCS-AP interface and the Gateway Mobile Location Center (GMLC) that is connected to the MME via the standardized Lg interface. The LTE system supports a range of methods to locate the position of the target devices (e.g. UEs) within the coverage area of the RAN. These methods differ in accuracy and availability. Typically, satellite based methods (Assisted GNSS) are accurate with a (few) meter(s) of resolution, but may not be available in indoor environments. On the other hand, Cell ID based methods are much less accurate, but have high availability. Therefore, LTE uses A-GPS as the primary method for positioning, while Cell-ID and OTDOA based schemes serve as fall-back methods.

In LTE the positioning node (aka E-SMLC or location server) configures the target device (e.g. UE), eNode B or a radio node dedicated for positioning measurements (e.g. LMU) to perform one or more positioning measurements depending upon the positioning method. The positioning measurements are used by the target device or by a measuring node or by the positioning node to determine the location of the target device. In LTE the positioning node communicates with UE using LTE positioning protocol (LPP) and with eNode B using LTE positioning protocol annex (LPPa).

Figure 6:
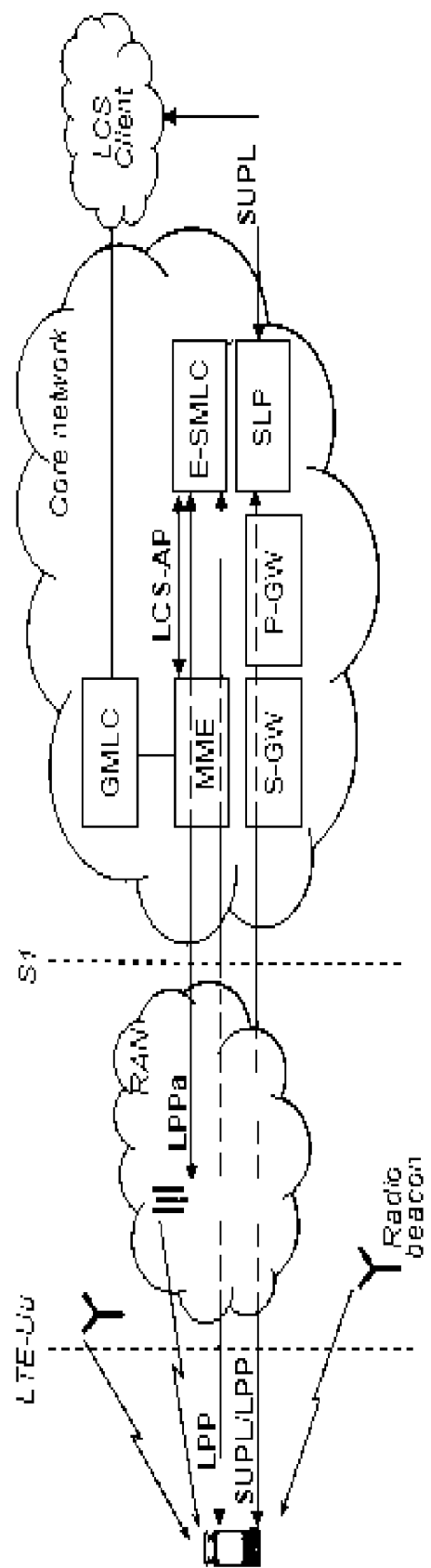
FIG. 6 is a block diagram of a LTE system according to some embodiments.

The LTE positioning architecture is shown in FIG. 6. The three key network elements in an LTE positioning architecture are the LCS Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e. the entities being positioned. LCS Clients may also reside in the LCS targets themselves. An LCS Client sends a request to LCS Server to obtain location information, and LCS Server processes and serves the received requests and sends the positioning result and optionally a velocity estimate to the LCS Client. A positioning request can be originated from the terminal or a network node or external client.

Position calculation can be conducted, for example, by a positioning server (e.g. E-SMLC or SLP in LTE) or UE. The former approach corresponds to the UE-assisted positioning mode when it is based on UE measurements, whilst the latter corresponds to the UE-based positioning mode.

E-CID Positioning

The E-CID positioning method uses one or more radio measurements for determining the target device's position. The E-CID method uses at least the cell ID of a serving and/or a neighboring cell and at least one additional radio measurements which can be performed by the target device or by a radio node. For example E-CID method typically uses any combination of cell ID and radio measurements such as UE Rx–Tx time difference, BS Rx–Tx time difference, timing advanced (TA) measured by the BS, LTE RSRP and/or RSRQ, HSPA CPICH measurements (CPICH RSCP and/or CPICH Ec/No), angle of arrival (AoA) measured by the BS on UE transmitted signals etc for determining the position of the target device. The TA measurement is done using either UE Rx–Tx time difference or BS Rx–Tx time difference or both. The location server may use several methods to determine the position of the target device. The E-CID positioning can also be target device based method or target device assisted method.

One important category of measurements used for E-CID belongs to the timing measurements. In LTE among the following timing measurements for E-CID positioning are standardized in release 9: (1) UE Rx–Tx time difference; (2) eNodeB Rx–Tx time difference; and (3) Timing advance (TA). The definitions of these measurements are below.

UE Rx–Tx Time Difference is defined as $T_{UE-RX} - T_{UE-TX}$, where $T_{UE-RX}$ is the UE received timing of downlink radio frame #i from the serving cell, defined by the first detected path in time. $T_{UE-TX}$ is the UE transmit timing of uplink radio frame #i. The reference point for the UE Rx–Tx time difference measurement shall be the UE antenna connector.

eNB Rx–Tx time difference is defined as $T_{eNB-RX} - T_{eNB-TX}$, where $T_{eNB-RX}$ is the eNB received timing of uplink radio frame #i, defined by the first detected path in time. The reference point for $T_{eNB-RX}$ shall be the Rx antenna connector. $T_{eNB-TX}$ is the eNB transmit timing of downlink radio frame #i. The reference point for $T_{eNB-TX}$ shall be the Tx antenna connector.

Timing advance measurement ($T_{ADV}$) has two types, Type 1 and Type 2. Timing advance ($T_{ADV}$) type 1 is defined as the time difference $T_{ADV}$=(eNB Rx–Tx time difference)+(UE Rx–Tx time difference), where the eNB Rx–Tx time difference corresponds to the same UE that reports the UE Rx–Tx time difference. Timing advance ($T_{ADV}$) type 2 is defined as the time difference $T_{ADV}$=(eNB Rx–Tx time difference), where the eNB Rx–Tx time difference corresponds to a received uplink radio frame containing PRACH from the respective UE.

The above measurements are similar to round trip time (RTT) measurements used in earlier systems. These measurements are based on both DL and UL transmissions. In particular, for UE Rx–Tx, the UE measures the difference between the time of the received DL transmission that occurs after the UE UL transmission and the time of the UL transmission. For eNodeB Rx–Tx, the eNodeB measures the difference between the time of the received UL transmission that occurs after the eNodeB DL transmission and the time of the DL transmission. All these measurements are currently done on PCell. However they could also be potentially performed on one or more SCells if UE supports carrier aggregation with 2 or more UL CCs.

In addition in LTE there are timing measurements which are implementation dependent and not explicitly standardized. One such example is one-way propagation delay, which is measured by eNodeB for estimation of timing advanced to be signalled to the UE.

In E-CID measurements, generally the downlink part (i.e. on signal transmitted by BS towards UE) of the measurement is generally performed on cell specific reference signal (CRS) or more generally reference signal (RS) in LTE. Certain implementation may also use synchronization signal for DL measurement e.g. PSS and SSS in LTE. Any of CRS, RS and PSS/SSS contains the physical cell ID (PCI) of the UE. Therefore the measurement is also associated with the cell ID of the cell on which the measurement is done by UE or BS. In HSPA the cell specific reference signal and synchronization signals are called as CPICH and P-SCH/S-SCH respectively.

Shared Cell

A shared cell in this context is a type of downlink (DL) coordinated multi-point (CoMP) where multiple geographically separated transmission points (TPs) dynamically coordinate their transmission towards the UE. The unique feature of shared cell is that all transmission points within the shared cell have the same physical cell ID (PCI). This means UE cannot distinguish between the TPs by the virtue of the PCI decoding. The PCI is acquired during a measurement procedure e.g. cell identification etc.

Figure 7:
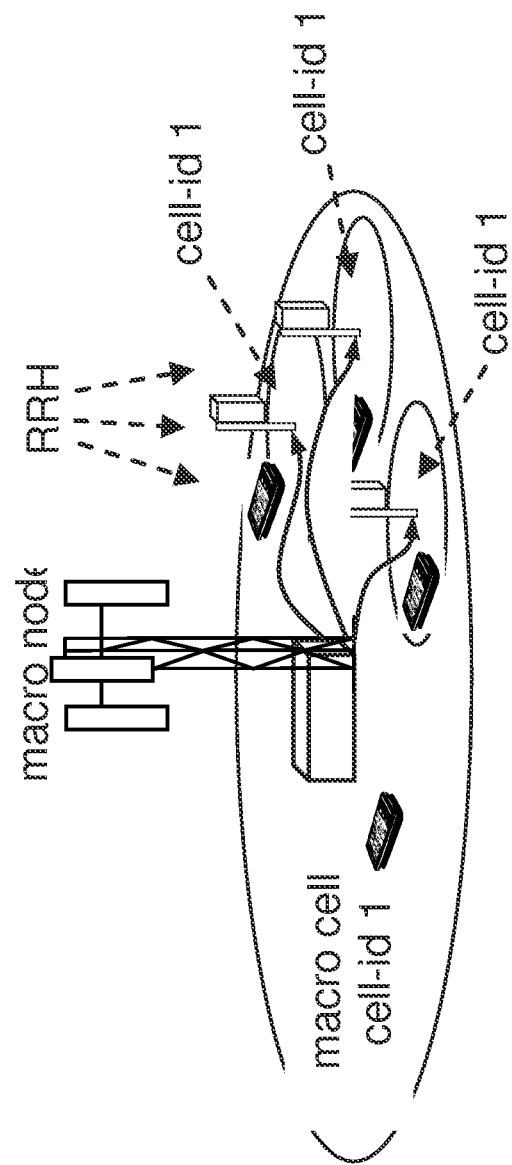
FIG. 7 is a block diagram of a shared cell according to some embodiments.

In typical deployment, a shared cell comprises of a heterogeneous network with low power RRHs within the macrocell coverage where the transmission/reception points created by the RRHs have the same cell IDs as that of the macro cell. In general a shared cell comprises of a set of low power nodes (LPN) and a serving high power node (HPN). This is shown in FIG. 7.

The shared cell approach can be implemented by distributing the same cell specific signals on all points (within the macro point coverage area). With such a strategy, the same physical signals such as primary synchronization signals (PSS), secondary synchronization signals (SSS), cell specific reference signals (CRS), positioning reference signal (PRS) etc and the same physical channels such as physical broadcast channel (PBCH), physical downlink shared channel (PDSCH) containing paging and system information blocks (SIBs), control channels (PDCCH, PCFICH, PHICH) etc are transmitted from each TP in the DL. Tight synchronization in terms of transmission timings between the TPs within a shared is used e.g. in order of ±100 ns between any pair of nodes. This enables the physical signals and channels transmitted from M points to be combined over air. The combining is similar to what is encountered in single-frequency networks (SFN) for broadcast. Due to the SFN effect, the average received signal strength on the UE side increases leading to improved coverage of the sync and control channels.

The maximum output power of a HPN can for example typically be between 43-49 dBm. Example of HPN is macro node (aka wide area base station). Examples of low power nodes are micro node (aka medium area base station), pico node (aka local area base station), femto node (home base station, or HBS), relay node etc. The maximum output power of a low power node for example typically is between 20-38 dBm depending upon the power class. For example a pico node typically has a maximum output power of 24 dBm whereas HBS has a maximum output power of 20 dBm.

The size of shared cell in terms of cell radius can vary from few hundred meters (e.g. 100-500 m) to few kilometers (e.g. 1-5 km).

The term shared cell is interchangeably used with other similar terms such as CoMP cluster with common cell ID, cluster cell with common cell ID, combined cell, RRH, RRU, distributed antenna system (DAS), heterogeneous network with shared cell ID, etc. Similarly the term transmission point is also interchangeably used with other similar terms such as radio nodes, radio network nodes, base station, radio units, remote antenna, etc. All of them bear the same meaning. For consistency the term shared cell which is also more generic is used herein. Furthermore the term transmission point (TP) for individual nodes within a shared cell is also used for consistency.

In a multi-carrier or carrier aggregation system, a carrier is generally termed as a component carrier (CC) or sometimes is also referred to a cell or serving cell. In principle each CC has multiple cells. The term carrier aggregation (CA) is also called (e.g. interchangeably called) "multi-carrier system", "multi-cell operation", "multi-carrier operation", "multi-carrier" transmission and/or reception. This means the CA is used for transmission of signaling and data in the uplink and downlink directions. One of the CCs is the primary component carrier (PCC) or simply primary carrier or even anchor carrier. The remaining ones are called secondary component carrier (SCC) or simply secondary carriers or even supplementary carriers. Generally the primary or anchor CC carries the essential UE specific signaling. The primary CC (aka PCC or PCell) exists in both uplink and downlink directions in CA. In case there is single UL CC the PCell is obviously on that CC. The network may assign different primary carriers to different UEs operating in the same sector or cell.

The multi-carrier operation may also be used in conjunction with multi-antenna transmission. For example signals on each CC may be transmitted by the eNB to the UE over two or more antennas. The CCs in CA may or may not be co-located in the same site or base station or radio network node (e.g. relay, mobile relay etc). For instance the CCs may originate (i.e. transmitted/received) at different locations (e.g. from non-located BS or from BS and RRH or RRU). Examples of combined CA and multi-point communication are DAS, RRH, RRU, CoMP, multi-point transmission/ reception etc. The embodiments herein also apply to multi-point carrier aggregation systems i.e. are applicable to each CC in CA or in CA combination with CoMP etc.

General Description of Timing Measurement in a Shared Cell

Figure 8:
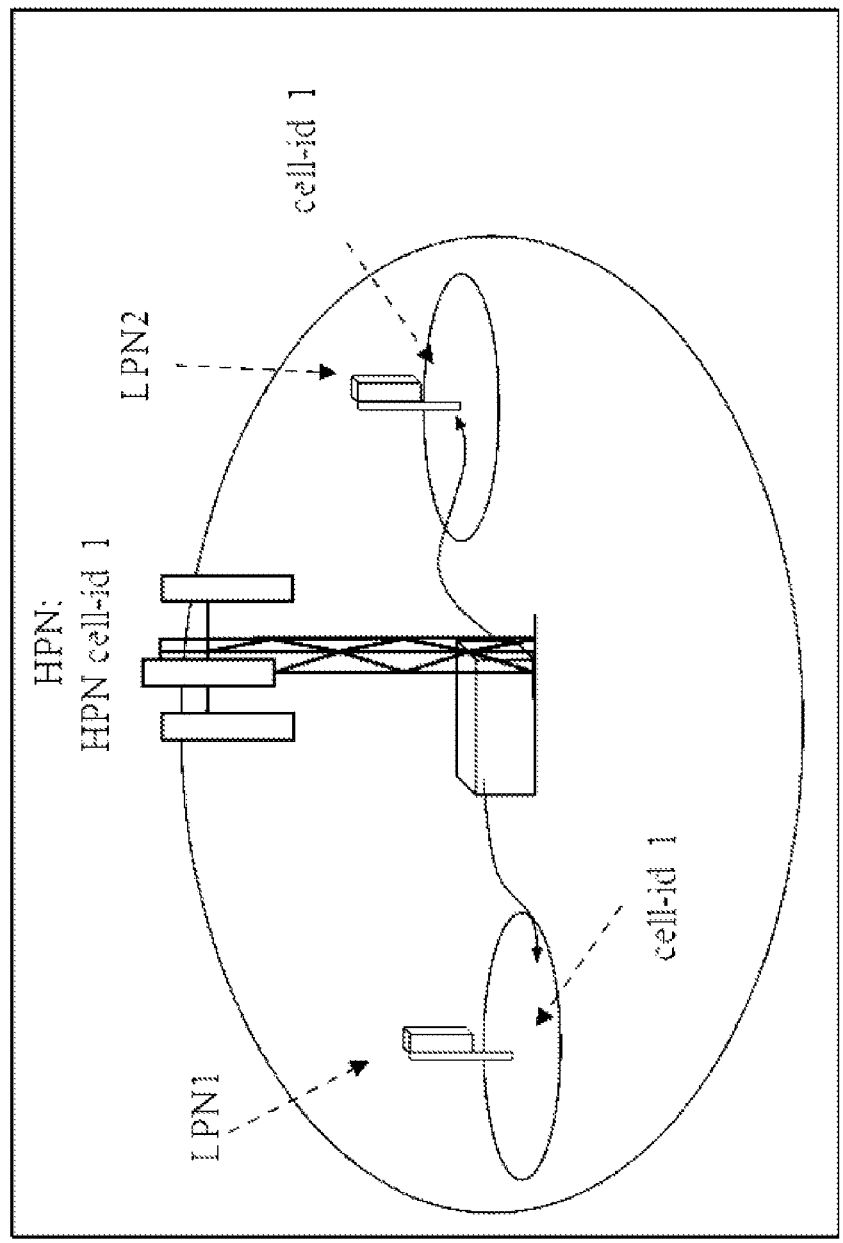
FIG. 8 is a block diagram of a shared cell according to other embodiments.

In general the shared cell may comprise of any number of nodes e.g. 1 HPN and 6 LPN nodes and so on. Therefore the embodiments are general enough to be applicable to any combination of nodes in a shared cell, where the term 'combination' may be characterized by node types (or deployment type) and/or applied RS transmission scheme to a subset or all nodes in the shared cell. Not necessarily all, but at least two transmission points (TPs) in the shared cell transmit the RS (e.g. CRS) with the same cell ID. But for simplicity FIG. 8 shows an example of a shared cell comprising of three transmission nodes or more specifically transmission points: HPN, LPN1 and LPN2 associated with the same cell ID e.g. cell ID 1, where all the three nodes transmit the same RS. Each TP is also associated with an identifier. Therefore the combination of shared cell ID and the ID of the TP enables UE or any other network node to uniquely identify the TP in the network or in an area with multiple cells.

The RS are typically transmitted in every subframe. But they may also be transmitted only in specific subframes, e.g. once every $5^{th}$ subframe, Or with a certain periodicity, e.g., PRS are transmitted with periodicity of 160 ms, 320 ms, 640 ms, or 1280 ms. In both cases the RS transmitted from different TPs are tightly time aligned e.g. within ±100 ns between any pair of TPs. In frequency domain the RS bandwidth can be equal to the bandwidth of the shared cell (i.e. full BW) or may be smaller, i.e., any of the allowed or pre-defined bandwidths e.g. 1.4 MHz, 3 MHz, 5 MHz, 10 MHz, 15 MHz or 20 MHz.

Figure 9:
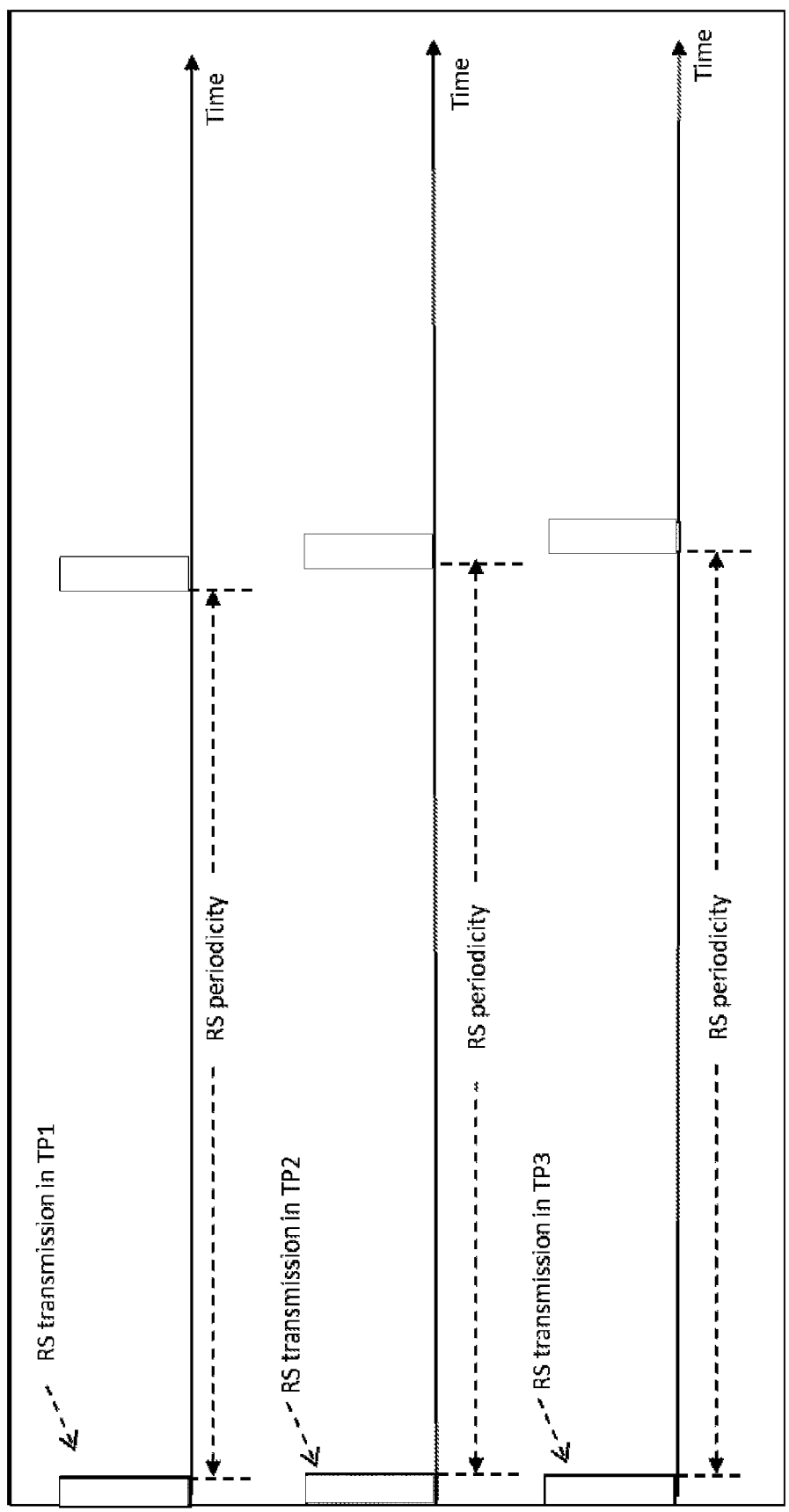
FIG. 9 illustrates an example of the time-aligned transmission of different reference signals (RSs) in a shared cell according to one or more embodiments.

FIG. 9 illustrates such a RS transmission scheme for shared cell comprising of 3 TPs. This scheme can be generalized for any number of TPs transmitting RS in a shared cell. The RS periodicity is typically 1 subframe. But it can also be 5 subrame e.g. in every subframe #0 in new carrier type (NCT).

The timing measurement considered herein can be performed by the UE or by the radio network node. Furthermore the timing measurement considered herein involves at least measuring on downlink RS transmitted by plurality of TPs associated with the same cell ID in the shared cell. The timing measurement may also be bi-directional, i.e., involve measuring also the radio signals transmitted by the UE; such timing measurement therefore involves measuring both uplink radio signals transmitted by the UE and downlink RS transmitted by the TPs. Examples of uplink radio signals on which measurement is done are SRS, DMRS, uplink pilot signals, random access channel, etc.

In this context, one or more embodiments herein envision that for a shared cell with common cell ID, a network node (e.g. serving TP, positioning node, MDT node, a coordinating node, etc.): (i) obtains radio measurements (e.g., at least one of: a timing measurement, received signal strength, received signal quality, angle of arrival, pathloss measurement, or any combination thereof, etc.) performed on at least a radio signal (e.g. SRS) transmitted by a UE received at a plurality of TPs in the shared cell; (ii) uses them to determine the TP which is closest to the UE, (iii) associates the ID of the determined TP and shared cell ID with a timing measurement performed for the UE and uses the associated UE timing measurement for one or more positioning tasks (e.g. determining location, reporting to positioning node, sending information to the UE, location determination for MDT purpose, etc).

More specifically the method in a radio network node (e.g. TP) may comprise (i) obtaining indication that timing measurement is performed by a UE on downlink reference signals transmitted by plurality of TPs with shared cell ID and on uplink signals transmitted by the UE; (ii) obtaining timing measurement performed by plurality of TPs on at least signal transmitted by the UE; (iii) determining, based on timing measurements performed by plurality of TPs, the TP which is closest to the UE; (iv) associating the UE timing measurement or indication about UE timing measurement with the cell ID of the shared cell and the ID of the determined TP, wherein the association uniquely relates the TP for which the UE timing measurement is applicable; and (v) using the measurement and the associated information for one or more positioning tasks (e.g. determining UE location, reporting measurements to positioning node, signaling associated information to positioning node, reporting and/or using the measurement for MDT purpose, etc).

The method in the radio network node may further comprise: (i) receiving an indication from a positioning node and/or UE that timing measurement is performed by the UE in shared cell and/or request from positioning node to perform timing measurements for plurality of TPs; (ii) obtaining timing measurements performed by plurality of TPs on at least signals transmitted by the UE; (iii) determining based on timing measurements performed by plurality of TPs, the TP which is closest to the UE; and (iv) sending relevant TP information comprising of at least an identifier of the determined TP and shared cell ID to the positioning node and/or to the UE.

According to some embodiments, a method in a UE served by a shared cell managed by a radio network node comprises: (i) receiving a request from a positioning node to perform timing measurement (e.g. UE Rx–Tx time difference) in the shared cell; and (ii) sending an indication to the radio network node that the UE is performing the timing measurement involving at least downlink reference signals from plurality of TPs in the shared cell.

According to some embodiments, a method in a positioning node comprises: (i) configuring a radio network node to perform timing measurement (e.g. eNB Rx–Tx, TA) in a shared cell and/or indicating that UE is doing a timing measurement in the shared cell involving multiple TPs; and (ii) receiving relevant TP information comprising of at least an identifier of the TP closest to the UE and shared cell ID and/or timing measurements performed by plurality of TPs in the shared cell.

At least some embodiments therefore address the following problem(s). The reference signals, or RS, (e.g. CRS) used for E-CID positioning measurements (e.g. UE Rx–Tx time difference) in LTE are associated with the physical cell ID of the radio node transmitting the RS. This enables the UE to distinctly identify the radio nodes involved in E-CID positioning measurements. But in a shared cell (e.g., employing RRHs or CoMP), which comprises of more than one radio node with all radio nodes sharing the same cell ID, the UE cannot distinguish between the radio nodes within the shared cell. This will significantly deteriorate the positioning accuracy based on E-CID positioning measurements which uses RS.

More generally, a shared cell where all TPs operate with the same cell ID, the common pilot or reference signals (e.g. CRS in LTE) configured on all these TPs will be transmitted also with the same cell ID. Therefore the UE will receive reference signals (RS) from all these TPs as if they are received from one location or site. Therefore the UE-reported E-CID measurement (e.g. UE Rx–Tx time difference) which is common for the entire shared cell will not allow the receiving positioning node or base station to distinguish between TPs within the shared cell and determine correctly the UE location. In other words the positioning determined based on this reported E-CID measurement will induce large positioning inaccuracy depending upon the size (e.g. radius) of the shared cell. For example if positioning node assumes the location of the HPN for determining UE location but the UE is reality closer to one of the LPN, then the positioning error will be at least larger than the distance between the HPN and LPN. Even if shared cell's radius is few hundred meters (500 m) the positioning error would be substantial. This will also prevent the network from meeting the regulatory requirements which require tight positioning accuracy under emergency call e.g. E911.

Broadly, at least some embodiments herein solve these problems such that E-CID positioning can work in shared cell without deteriorating the positioning accuracy compared to that in legacy deployment (i.e. non-shared cell deployment).

Several embodiments are described in the following sections:

Method in a Network Node of Determining Relevant TP for Timing Measurement in Shared Cell In this embodiment a network node (which may also be a radio network node managing a shared cell with plurality of TPs or a network node receiving measurements from multiple TPs of the same shared cell) determines the most relevant TP for a second timing measurement performed by the UE and/or radio network node on at least signals transmitted by plurality of TPs. The determination step is triggered by one or more mechanism as disclosed in the next section. The determining may involve determining the most relevant TP from a known set or a subset of TPs in a shared cell. In one example, the term "most relevant" may refer to the "closest" TP. In another example, the term "most relevant" may refer to the TP for which the UL measurement matches best with the second timing measurement, e.g., both measurements indicate similar distance between UE and TP and from such comparison for different TPs the most relevant TP is selected.

The radio network node herein can be one of the TPs in a shared cell or another network node managing or controlling the shared cell. Typically this is the serving TP in the shared cell e.g. eNode B or any HPN.

In one or more embodiments, the relevant TP herein refers to the TP which is closest to the UE which performs timing measurement and/or whose position is to be determined. The relevant TP can be determined by the radio network node by: (i) obtaining radio measurements (e.g., at least one of: timing measurements, power-based measurements such as received signal strength or received signal quality, pathloss measurement, angle or arrival measurement, etc. or any combination thereof) performed by plurality of TPs on at least UL radio signals (e.g., SRS signals) transmitted by the UE; and (ii) determining the most relevant TP within the shared cell for the UE positioning by a applying a function to the obtained radio measurements performed by plurality of TPs.

An example of the function is minimum as explained below. Assume $\Delta_1, \Delta_2, \Delta_3, \ldots, \Delta_N$ are Rx–Tx time difference measurements performed by $TP_1, TP_2, TP_3 \ldots TP_N$ respectively. The radio network node determines the relevant TP using (1):

$$\Delta_j = \mathrm{MIN}(\Delta_1, \Delta_2, \Delta_3, \ldots, \Delta_N) \qquad (1)$$

Where $1 \le j \le N$ and the determined relevant TP is $TP_j$.

In another example, the most relevant TP is selected on degree of similarity (providing the best match) between the timing measurement and the UL measurement.

Regardless of the particular way to determine the relevant TP, the network node in at least some embodiments associates the identifiers of the determined relevant $TP_j$ and shared cell ID with at least the UE ID and also if available with the radio measurement performed by $TP_j$.

The determined relevant TP (e.g. $TP_j$) may further be used by the network node for determining the UE position as described in next section.

Method in a Network Node of Triggering the Determination of the Relevant TP for Timing Measurement in a Shared Cell The network node (which may also be a radio network node) initiates the procedure to determine the relevant TP in response to one or more triggering conditions or request received from another node (e.g., a network node, a radio network node, or a UE). The triggering may also comprise triggering/configuring UL transmissions from the UE to enable the determination of the TPs. A few non-limiting examples are provided below.

Autonomous Triggering

In this case whenever the TPs in a shared cell intend to perform timing measurements for determining UE location or for sending them to another node (e.g. positioning node) then the radio network node managing TPs in the shared cell will initiate the procedure described in the previous section.

For example assume plurality of TPs perform eNode B Rx–Tx time difference measurement, which involve UL signals transmitted by the UE and also DL signals transmitted by the TPs themselves. Further assume DL signals are CRS in LTE. The radio network node (e.g. serving TP) obtains eNode B Rx–Tx time difference measurements from all TPs within the shared cell which are doing the measurement. The radio network node then uses the function (e.g. MIN function) to determine the relevant TP, which is considered for determining the UE location based on at least these eNode B Rx–Tx time difference measurements.

In another example, the triggering occurs when multiple timing measurements from different TPs are obtained and the measurements are associated with the same shared cell.

In yet another example, the triggering occurs when at least one measurement is obtained for a shared cell and the TP associated with the measurement is unknown. In this case, the triggering may comprise triggering/configuring UL transmission from the UE to enable the determination of the TP associated with the obtained measurement.

Triggering by Indication Received from Positioning Node

In this case the positioning node sends an indication or a request to the radio network node that the relevant TP for certain UE served by or operating in a shared is required. The positioning node may maintain a list of all shared cells operating in its vicinity. This list may comprise of cell information (e.g. PCI, CGI, UL/DL carrier frequency or UL/DL EARFCN, frequency band indicator etc) of all shared cells. Alternatively the radio network node may also inform positioning node about the shared cells in the area i.e. cell information of shared cells.

The message sent by the positioning node typically will contain the UE identifier and the corresponding shared cell ID of the shared cell.

The positioning node may send an indication triggering the procedure in the radio network node for one or more scenarios. In one example the positioning node sends a request to the radio network node for obtaining UL timing measurements (e.g. eNode B Rx–Tx time difference, timing advance etc) for certain UE in the shared cell. In another example the positioning node sends a request to the UE to perform for example timing measurement (e.g. UE Rx–Tx time difference) via LPP protocol. In addition the positioning node also indicates in the message sent to the radio network node that the UE is performing certain timing measurement in the shared cell.

It may be pre-defined that under one or more above scenarios the radio network node will determine the relevant TP for the UE (e.g. TP closest to the UE) and if needed will also provide the relevant TP ID to the positioning node.

Triggering by Indication Received from UE

In this scenario the UE may directly send an indication or a message to the radio network node that relevant TP for this UE needs to be determined by the radio network node. If the UE is also performing the timing measurement involving DL signals in shared cell then the UE may also indicate that it is performing certain type of measurement (e.g. UE Rx–Tx time difference).

The indication received from the UE may be implicit and comprise e.g. an indication that the UE performs a certain type of measurement and the indicated measurement type may serve as a trigger. Such indication may also be sent when the UE is aware of that the measurement is to be performed in a shared cell.

In another example the UE may receive a request from positioning node that relevant TP is to be determined for this UE by the radio network node and forward the received indication to the radio network node. Therefore UE acts as a relay.

The UE may also indicate that whether the relevant TP to be determined is of the serving cell with shared cell ID or a neighbor cell with shared cell ID. By default the relevant TP of the serving cell of the UE is to be determined.

Upon receiving an indication from the UE the network node (which may also be a radio network node) will initiate the procedure to determine the relevant TP as described earlier.

Method in a Network Node of Using the Determined Relevant TP for Timing Measurement in Shared Cell The network node (which may also be a radio network node) uses the determined relevant TP and associated information for one or more radio operations or radio tasks. The information related to the relevant TP comprise of at least the ID of the determined relevant TP, shared cell ID, UE ID and optionally timing measurement value (e.g. TA, eNode B UE Rx–Tx time difference etc). The information may also comprise the location of the determined TP.

Some non-limiting examples of using the information related to the relevant TP are disclosed below.

Signaling Information to UE

In this case the radio network node signals the information related to the relevant TP to the UE. The radio network node may decide to provide this information to the UE autonomously or upon a request received from the UE or from another node (e.g. positioning node).

The UE upon receiving this information may use it for one or more tasks. For example the UE may forward the information or part of it to the positioning node via LPP protocol or signal this to another node for MDT purpose.

In another example the UE may use this for determining its own position e.g. for UE based positioning.

In yet another example the UE may signal the received information to another UE via D2D communication if both UEs are D2D communication capable.

Signaling Information to Other Network Nodes

In this case the network node signals the information related to the relevant TP to the other network nodes. Examples of other network nodes are positioning node, MDT node, TP of another shared cell, neighboring BS etc.

The radio network node may decide to send the information to the other network node autonomously, in response to request received from the other network node e.g. from positioning node via LPPa protocol or even in response to a request send by the UE.

The receiving network node may use the received information for one or more tasks. Examples of tasks are positioning node using the information for determining UE position in the shared cell. Another example is the MDT purpose.

Determination of UE Position

In this case the radio network node uses the information related to the relevant TP for determining the UE location. That is the radio network node uses the geographical coordinates of the determined relevant TP and one or more relevant positioning measurements when determining the UE location. The relevant positioning measurement for example can be the eNode B Rx–Tx time difference measurement performed by the relevant TP of the UE.

Method in a UE of Signaling Capability Associated with Indication

According to this embodiment the UE signals its capability informing the network node (e.g. eNode B, positioning node, MME, core network node etc) that it is capable of managing information associated with the use of relevant TP within the shared cell for positioning. More specifically the UE capability signaled to the network node may comprise one or more of the following: (i) UE is capable of informing the radio network node that it is performing certain timing measurement in shared cell with plurality of TPs; (ii) UE is capable of receiving the information related to the relevant TP from the radio network node; (iii) UE is capable of forwarding the received and/or the determination information related to the relevant TP to positioning node; (iv) UE is capable of forwarding the received and/or the determination information related to the relevant TP to another UE.

The UE capability signaled to the network node may alternatively or additionally comprise the following: UE is capable of determining itself the relevant TP based on one or more radio measurements on TP specific DL radio signals, where the UE may use radio measurements such as CQI or CSI-RSRP performed on CSI-RS signaled by all TPs. Each CSI-RS is associated with the TP ID. For example the UE may determine the relevant TP whose radio measurement (e.g. CQI) is strongest i.e. have the highest value.

The UE may send the above mentioned capability information to the network node in any of the following manner: (i) Proactive reporting without receiving any explicit request from the network node (e.g. serving or any target network node); (ii) Reporting upon receiving any explicit request from the network node (e.g. serving or any target network node); (iii) The explicit request can be sent to the UE by the network anytime or at any specific occasion. For example the request for the capability reporting can be sent to the UE during initial setup or after a cell change (e.g. handover, RRC connection re-establishment, RRC connection release with redirection, PCell change in CA, PCC change in PCC etc).

The network node (e.g. serving eNode B, BS, positioning node, relay, RNC, BSC, MME etc) may use the received UE capability information for performing one or more radio operational tasks related to measurement, positioning, configuration of parameters etc. In general the network node may initiate the relevant procedure supported by the UE. For example if the UE can receive the information associated with the relevant TP from the network node and can also forward it to positioning node then the network node will signal the information about the determined relevant TP to the UE. If the UE does not support this capability then the network node will signal the information about the determined relevant TP to the positioning node.

The network node may also forward the received UE capability information to other network node e.g. to neighboring radio network node, SON etc. This will avoid the need for the UE to again signal its capability to a new serving radio node after the cell change e.g. after handover. In this way signaling overheads can be reduced.

Method in a Network of Signaling its Capability Associated with Measurements in a Shared Cell The embodiments in this section may also be combined with one or more of other embodiments described in other sections.

A network node (which may also be a radio network node such as e.g. eNodeB) may indicate to another node (e.g., another network node, another radio network node, or UE) its capability to support measurements for positioning in a shared cell. The capability may comprise its ability of any one or more of: (i) to determine, based on an UL measurement, the TP associated with a second measurement in a shared cell, where the second measurement may be a downlink measurement or a bi-directional measurement; (ii) to trigger/configure an UL transmission in the UE to support the determination of the TP associated with the second measurement, where the triggering may occur prior, during or after the second measurement is performed; (iii) to signal to another node (e.g., positioning node, MDT node, another radio network node such as BS, etc.) the information associated with the determined TP (e.g., TP ID, TP location, etc.); (iv) to determine UE location based on measurements performed in a shared cell; (v) to select DL RS type, adaptively to the measurement type, e.g., configure a specific type of RS in DL (e.g., that are different for different TPs in the same shared cell) to enable unambiguous determination of the UE location in a shared cell based on measurements involving measuring radio signals transmitted by different TPs (e.g., when eNodeB receives a request for a timing measurement for the purpose of positioning).

Method in a Network Node of Verifying a TP Associated with a Timing Measurement in Shared Cell A network node (which may also be a radio network node) may use an UL measurement for verifying an association of a (e.g., determined earlier) TP with a timing measurement within a shared cell. The verification principle may be based on, e.g., (i) on the "most relevant" approach described above, and/or (ii) comparison to a threshold of the amount of the mismatch between the UL measurement and the second measurement involving at least DL measurement.

The verification result may further be used by the node, e.g., for positioning, MDT, or some RRM purpose, or it may be signaled to another node. Based on the verification result, the node may also decide whether the timing measurement is to be further or to be dropped. In another example, the verification result may also be used for determining the uncertainty or reliability of the timing measurement, which may further be used e.g. in determining UL location or in sorting/prioritizing timing measurements when selecting a subset of the timing measurements for further use (for example, when timing measurements for 10 nodes, including at least 2 TPs of the same shared cell, were obtained while timing measurements from only 6 nodes are to be selected for further use).

Advantages of one or more embodiments herein are numerous. One or more embodiments herein for instance enables UE and positioning node to uniquely identify each radio node involved in E-CID positioning measurement (e.g. UE Rx-Tx time difference measurement, TA, eNode B Rx-Tx time difference measurement etc) even if the RS are transmitted with the same cell ID in all radio nodes in shared cell. Moreover, the positioning accuracy based on E-CID or on hybrid positioning method can be significantly improved in a shared cell where same cell ID is used in TPs within the shared cell e.g. CoMP, RRH etc. Still further, the regulatory requirements for emergency call can be met. And, the network does not have to deploy special radio nodes to enable positioning in the vicinity of shared cell.

Figure 10:
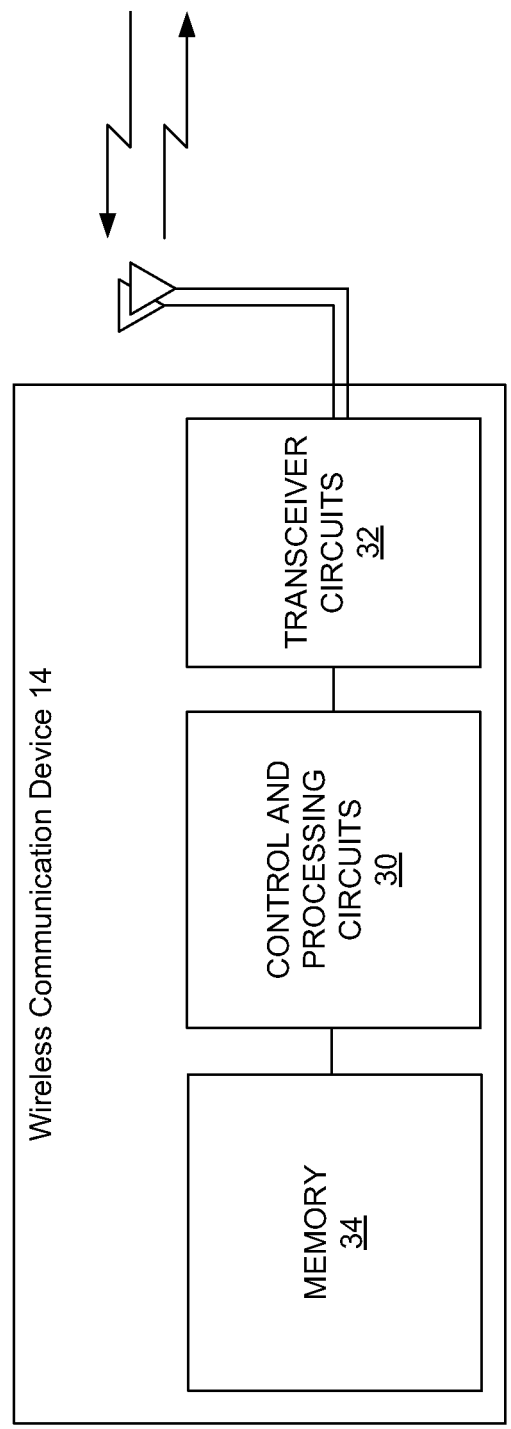
FIG. 10 is a block diagram of a wireless communication device according to one or more embodiments.

In view of the above described variations and modifications, those skilled in the art will appreciate that a radio node (e.g, a wireless communication device 14) herein generally is configured according to the apparatus shown in FIG. 10. As shown, the device 14 includes one or more processing circuits 30 configured to perform the functionality described above. The device 14 also includes one or more transceiver circuits 32 configured to both transmit and receive wireless signals. The one or more transceiver circuits 32, for example, includes various radio-frequency components (not shown) to receive and process radio signals from one or more radio network nodes, via one or more antennas, using known signal processing techniques.

The device 14 in some embodiments further comprises one or more memories 34 for storing software to be executed by, for example, the one or more processing circuits 30. The software comprises instructions to enable the one or more processing circuits 30 to perform the functionality described above. The memory 34 may be a hard disk, a magnetic storage medium, a portable computer diskette or disc, flash memory, random access memory (RAM) or the like. Furthermore, the memory 34 may be an internal register memory of a processor.

Figure 11:
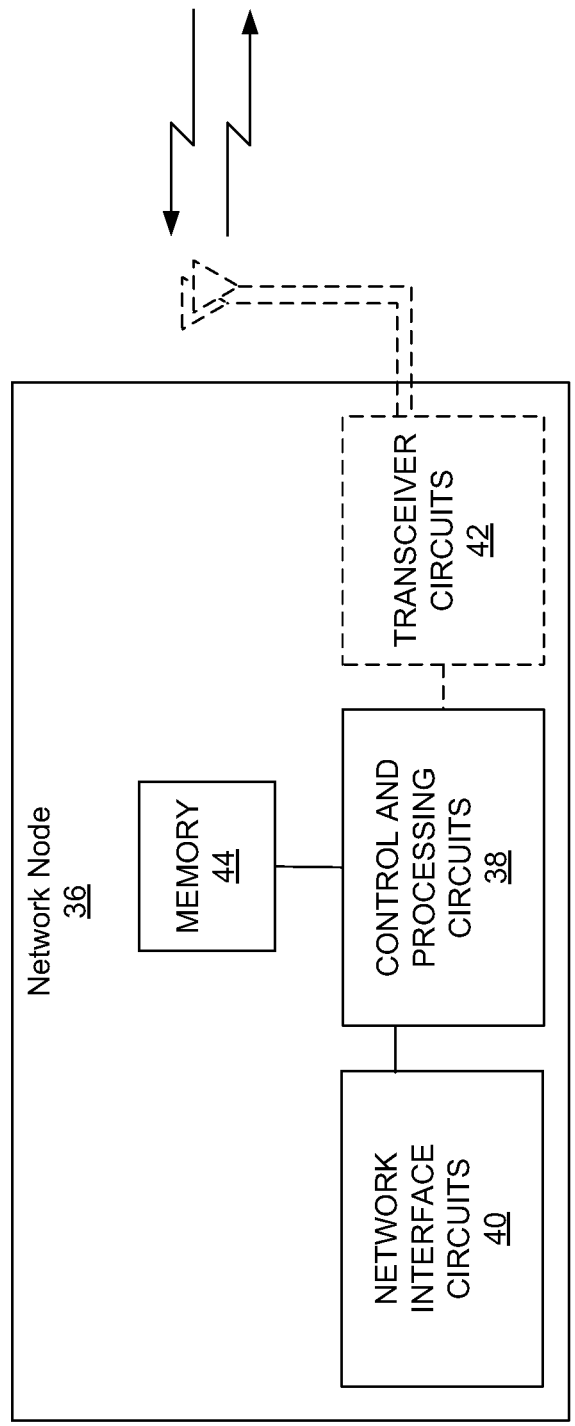
FIG. 11 is a block diagram of a network node according to one or more embodiments.

Those skilled in the art will also appreciate that a network node herein (e.g., a radio network node, positioning node, etc.) generally is configured according to the apparatus shown in FIG. 11. As shown, the node 36 includes one or more processing circuits 38 configured to perform the functionality described above. The node 36 also includes one or more network interface circuits 40 configured to communicatively connect the node 36 to one or more other nodes in the wireless communication system 10. In embodiments where the network node 36 is a radio node, the node 36 also includes one or more transceiver circuits 42 configured to both transmit and receive wireless signals. The one or more transceiver circuits 42, for example, includes various radio-frequency components (not shown) to receive and process radio signals from one or more wireless communication devices 14, via one or more antennas, using known signal processing techniques.

The node 36 in some embodiments further comprises one or more memories 44 for storing software to be executed by, for example, the one or more processing circuits 38. The software comprises instructions to enable the one or more processing circuits 38 to perform the functionality described above. The memory 44 may be a hard disk, a magnetic storage medium, a portable computer diskette or disc, flash memory, random access memory (RAM) or the like. Furthermore, the memory 44 may be an internal register memory of a processor.

Of course, not all of the steps of the techniques described herein are necessarily performed in a single microprocessor or even in a single module. Thus, a more generalized control circuit configured to carry out any of the operations described above may have a physical configuration corresponding directly to certain processing circuit(s) or may be embodied in two or more modules or units. The device or network node may for instance include different functional units, each configured to carry out a particular step of the method which it performs.

Those skilled in the art will also appreciate that embodiments herein further include a corresponding computer program for each disclosed method. The computer program comprises instructions which, when executed on at least one processor of a measuring node, radio network node, or positioning node, cause that node to carry out the corresponding processing described above. Embodiments further include a carrier containing such a computer program. This carrier may comprise one of an electronic signal, optical signal, radio signal, or computer readable storage medium. Those skilled in the art will appreciate that such a computer program according to some embodiments comprises one or more code modules contained in memory, each module configured to carry out a particular step of the executed method.

Those skilled in the art will also appreciate that the various "circuits" described may refer to a combination of analog and digital circuits, including one or more processors configured with software stored in memory and/or firmware stored in memory that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Note that certain terminology has been used throughout this description. In particular, a wireless device and UE are used interchangeably in the description. A UE may comprise any device equipped with a radio interface and capable of at least generating and transmitting a radio signal to a radio network node. Note that even some radio network nodes, e.g., a relay, an LMU, or a femto BS (aka home BS), may also be equipped with a UE-like interface, e.g., transmitting in UL and receiving in DL. Some example of "UE" that are to be understood in a general sense are PDA, laptop, mobile, iPOD, iPAD, sensor, fixed relay, mobile relay, wireless device capable of device-to-device (D2D) communication, wireless device for short-range communication (e.g., Bluetooth), wireless device capable of machine-to-machine (M2M) communication (aka machine type communication), customer premise equipment (CPE) for fixed wireless access, any radio network node equipped with a UE-like interface (e.g., small RBS, eNodeB, femto BS, LMU).

A radio node is characterized by its ability to transmit and/or receive radio signals and it comprises at least a transmitting or receiving antenna, own or shared with another radio node. A radio node may be a UE or a radio network node. Some examples of radio nodes are a radio base station (e.g., eNodeB in LTE or NodeB in UTRAN), a relay, a mobile relay, remote radio unit (RRU), remote radio head (RRH), a sensor, a beacon device, a measurement unit (e.g., LMUs), user terminal, PDA, mobile, iPhone, laptop, etc. A radio node may be capable of operating or receiving radio signals or transmitting radio signals in one or more frequencies, and may operate in single-RAT, multi-RAT or multi-standard mode (e.g., an example dual-mode user equipment may operate with any one or combination of WiFi and LTE or HSPA and LTE/LTE-A; an example eNodeB may be a dual-mode or MSR BS).

A measuring node is a radio node performing signals on radio signals. Depending on the embodiments, the measuring node may perform measurements on DL signals (e.g., a wireless device or a radio network node equipped with a UE-like interface, relay, etc.) or UL signals (e.g., a radio network node in general, eNodeB, WLAN access point, LMU, etc.).

A radio network node is a radio node comprised in a radio access network, unlike user terminals or mobile phones. A radio network node e.g., including eNodeB, single- or multi-RAT BS, multi-standard BS, RRH, LMU, RRU, WiFi Access Point, or even transmitting-only/receiving-only nodes, may or may not create own cell and may comprise in some examples a transmitter and/or a receiver and/or one or more transmit antennas or one and/or more receive antennas, where the antennas are not necessarily co-located. It may also share a cell with another radio node which creates own cell. More than one cell may be associated with one radio node. Further, one or more serving cells (in DL and/or UL) may be configured for a UE, e.g., in a carrier aggregation system where a UE may have one Primary Cell (PCell) and one or more Secondary Cells (SCells). A radio network node may also comprise or be comprised in multi-antenna or distributed antenna system.

A network node may be any radio network node or core network node. Some non-limiting examples of a network node are an eNodeB, RNC, positioning node, MME, PSAP, SON node, TCE, MDT node, (typically but not necessarily) coordinating node, a gateway node, and O&M node.

Positioning node described in different embodiments is a node with positioning functionality. For example, for LTE it may be understood as a positioning platform in the user plane (e.g., SLP in LTE) or a positioning node in the control plane (e.g., E-SMLC in LTE). SLP may also consist of SLC and SPC, where SPC may also have a proprietary interface with E-SMLC. Positioning functionality may also be split among two or more nodes, e.g., there may be a gateway node between LMUs and E-SMLC, where the gateway node may be a radio base station or another network node; in this case, the term "positioning node" may relate to E-SMLC and the gateway node. In some examples, positioning functionality may also fully or partly reside in a radio network node (e.g., RNC or eNB). In a testing environment, a positioning node may be simulated or emulated by test equipment.

The term "coordinating node" used herein is a network and/or node, which coordinates radio resources with one or more radio nodes. Some examples of the coordinating node are network monitoring and configuration node, OSS node, O&M, TCE, MDT node, SON node, positioning node, MME, a gateway node such as Packet Data Network Gateway (P-GW) or Serving Gateway (S-GW) network node or femto gateway node, a macro node coordinating smaller radio nodes associated with it, eNodeB coordinating resources with other eNodeBs, etc.

The signaling described herein is either via direct links or logical links (e.g. via higher layer protocols and/or via one or more network and/or radio nodes). For example, signaling from a coordinating node may pass another network node, e.g., a radio network node.

The embodiments are not limited to LTE, but may apply with any Radio Access Network (RAN), single- or multi-RAT with or without carrier aggregation support. Some other RAT examples are LTE-Advanced, UMTS, HSPA, GSM, cdma2000, WiMAX, and WiFi.

The embodiments are applicable when doing measurement in a shared cell on an intra-frequency carrier, on inter-frequency carrier with or without gaps or on any multi-carrier system.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, implemented by a node in a wireless communication system, the method comprising:
    obtaining results of one or more first radio measurements performed on one or more first radio signals transmitted or received by geographically separated transmission points (TPs) of a shared cell;
    determining, using the obtained results and from among the TPs that transmit second radio signals based on the same cell identity, a particular TP that transmits the second radio signal on which a positioning measurement is performed for determining a target wireless communication device's position; and
    using information related to the determined TP to perform one or more positioning tasks.

2. The method of claim 1:
    further comprising associating the same cell identity and an identity of the determined TP with an identity of the target device and/or a result of the positioning measurement; and
    wherein the information related to the determined TP indicates the association.

3. The method of claim 1, wherein the one or more positioning tasks include signaling the information to another node.

4. The method of claim 1, wherein the one or more positioning tasks include using the position of the determined TP and a result of the positioning measurement to determine the target device's position.

5. The method of claim 1, wherein the obtaining comprises obtaining the results of different first radio measurements performed by the different TPs on at least uplink signals transmitted to the TPs.

6. The method of claim 1:
    wherein the obtaining comprises obtaining the results of one or more first radio measurements performed on at least TP-specific downlink radio signals transmitted by the TPs;
    wherein the TP-specific downlink radio signals are transmitted by the TPs based on different TP identities.

7. The method of claim 1, wherein the determining comprises determining the particular TP as the TP that, as indicated by the obtained results, is closest to a particular wireless communication device, wherein the particular wireless communication device performs the positioning measurement and/or is the target device.

8. The method of claim 1, wherein the determining comprises comparing the results of the first radio measurements to one another and/or to the result of the positioning measurement.

9. The method of claim 1, wherein the determining comprises:
    comparing the results of the first radio measurements to one another;
    determining based on the comparison the maximum, or alternatively the minimum, one of the results; and
    identifying the particular TP as the TP that transmitted or received the first radio signal on which the first radio measurement with the maximum or minimum result was performed.

10. The method of claim 1:
    further comprising obtaining the result of the positioning measurement;
    wherein the determining comprises determining which of the first radio measurements has a result that best matches with the result of the positioning measurement according to one or more defined criterions; and
    identifying the particular TP as the TP that transmitted or received the first radio signal on which the determined first radio measurement was performed.

11. The method of claim 10:
    wherein the result of each of the first radio measurements indicates a position of the target device;
    wherein the determining comprises determining which of the first radio measurements has a result that indicates a position of the target device most similar to that indicated by the positioning measurement.

12. The method of claim 1, wherein the one or more first radio measurements comprise one or more timing measurements.

13. The method of claim 1, wherein the one or more first radio measurements comprise at least one of:
    one or more eNodeB Rx-Tx time difference measurements;
    one or more timing advance type 1 or type 2 measurements;
    one or more propagation delay measurements in a Long Term Evolution (LTE) system.

14. The method of claim 1, wherein the positioning measurement comprises a timing measurement.

15. The method of claim 1, wherein the positioning measurement comprises a UE Rx-TX time difference measurement in a Long Term Evolution (LTE) system.

16. The method of claim 1:
    wherein the positioning measurement is performed on a cell-specific reference signal (CRS) in a Long Term Evolution (LTE) system;
    wherein the TPs transmit CRS in the shared cell based on the same physical cell identity (PCI).

17. The method of claim 1, wherein the positioning measurement is performed for enhanced cell identity (E CID) positioning.

18. The method of claim 1, wherein the positioning measurement is inherently TP-agnostic such that the particular TP which transmits the radio signal on which the positioning measurement is performed is not distinguishable by determining the cell identity used for that transmission.

19. The method of claim 1, wherein the second radio signals that the geographically separated TPs of the shared cell transmit based on the same cell identity are not transmitted based on different TP identities of those TPs.

20. A method, implemented by a wireless communication device in a wireless communication system, the method comprising:
    performing a positioning measurement on one of multiple radio signals that geographically separated transmission points (TPs) of a shared cell transmit based on the same cell identity;
    determining a particular TP that transmits the radio signal on which the wireless communication device performs the positioning measurement; and
    associating an identity of the particular TP and the same cell identity with an identity of the wireless communication device and/or a result of the positioning measurement.

21. The method of claim 20, wherein the determining comprises receiving the identity of the particular TP from a network node.

22. The method of claim 20, wherein the determining comprises:
performing one or more radio measurements on one or more TP-specific downlink radio signals received from one or more of the TPs; and
determining the particular TP using the results of those one or more radio measurements.

23. The method of claim 22 wherein the determining comprises:
comparing the results of radio measurements performed on multiple TP-specific downlink radio signals to one another;
determining, based on the comparison, the maximum one of the results; and
identifying the particular TP as the TP that transmitted the TP-specific downlink radio signal on which the radio measurement with the maximum result was performed.

24. The method of claim 20, further comprising sending information indicating the association to another node.

25. The method of claim 20, wherein the positioning measurement is inherently TP-agnostic such that the particular TP which transmits the radio signal on which the positioning measurement is performed is not distinguishable by determining the cell identity used for that transmission.

26. The method of claim 20, wherein the radio signals that the geographically separated TPs of the shared cell transmit based on the same cell identity are not transmitted based on different TP identities of those TPs.

27. A method, implemented by a node in a wireless communication system, the method comprising:
determining that a positioning measurement for determining the position of a target wireless communication device has been or is to be performed in a shared cell on one of multiple second radio signals that geographically separated transmission points (TPs) of the shared cell transmit based on the same cell identity; and
responsive to the determination, triggering a procedure that uses the results of one or more first radio measurements to determine the particular TP that transmits the second radio signal on which the positioning measurement has been or is to be performed, the one or more first radio measurements performed on one or more first radio signals transmitted or received by the TPs.

28. The method of claim 27, further comprising obtaining an identity of the particular TP and/or the results of the one or more first radio measurements, and performing one or more positioning tasks based thereon.

29. The method of claim 28, wherein the obtaining comprises receiving information associating the identity of the particular TP with an identity of the target wireless communication device, or information associating both the identity of the particular TP and the same cell identity with the identity of the target wireless communication device.

30. The method of claim 27, wherein the triggering comprises sending, to a radio network node controlling one of the TPs, a request that the radio network node obtain the one or more first radio measurements as one or more measurements of at least uplink signals transmitted by the target wireless communication device.

31. The method of claim 27, wherein the triggering comprises sending the target wireless communication device a request and/or configuring the target wireless communication device to perform the positioning measurement as a measurement of downlink signals transmitted by the TPs.

32. The method of claim 27, wherein the triggering comprises sending, to the target device and/or to a radio network node controlling one of the TPs, an indication that the target device and/or the radio network node needs to determine the particular TP.

33. The method of claim 27, wherein the triggering comprises sending, to a network node, an indication that the positioning measurement involves downlink signals in a shared cell.

34. The method of claim 27, wherein the triggering comprises sending, to a network node, an indication that the positioning measurement is particular type of measurement.

35. The method of claim 27, wherein the determining comprises receiving a request that the positioning measurement is to be performed.

36. A node in a wireless communication system, the node comprising:
memory;
one or more processing circuits operatively connected to the memory and configured to:
obtain the results of one or more first radio measurements performed on one or more first radio signals transmitted or received by geographically separated transmission points (TPs) of a shared cell;
determine, using the obtained results and from among TPs that transmit second radio signals based on the same cell identity, a particular TP that transmits the second radio signal on which a positioning measurement is performed for determining a target wireless communication device's position; and
use information related to the determined TP to perform one or more positioning tasks.

37. The node of claim 36, wherein the one or more first radio measurements comprise one or more timing measurements.

38. The node of claim 37, wherein the one or more first radio measurements comprise one or more of:
one or more eNodeB Rx-Tx time difference measurements;
one or more timing advance type 1 or type 2 measurements;
one or more propagation delay measurements in a Long Term Evolution (LTE) system.

39. The node of claim 36, wherein the positioning measurement comprises a timing measurement.

40. The node of claim 36, wherein the positioning measurement comprises a UE Rx-TX time difference measurement in a Long Term Evolution (LTE) system.

41. The node of claim 36:
wherein the positioning measurement is performed on a cell-specific reference signal (CRS) in a Long Term Evolution (LTE) system;
wherein the TPs transmit CRS in the shared cell based on the same physical cell identity (PCI).

42. The node of claim 36, wherein the positioning measurement is performed for enhanced cell identity (E CID) positioning.

43. A node in a wireless communication system, the node comprising:
a wireless communication device comprising memory and one or more processing circuits operatively connected to the memory;
wherein the one or more processing circuits are configured to:

perform a positioning measurement on one of multiple radio signals that geographically separated transmission points (TPs) of a shared cell transmit based on the same cell identity;

determine a particular TP that transmits the radio signal on which the wireless communication device performs the positioning measurement; and associate an identity of the particular TP and the same cell identity with an identity of the wireless communication device and/or a result of the positioning measurement.

44. A node in a wireless communication system, the node comprising;

memory;

one or more processing circuits operatively connected to the memory and configured to:

determine that a positioning measurement for determining the position of a target wireless communication device has been or is to be performed in a shared cell on one of multiple second radio signals that geographically separated transmission points (TPs) of the shared cell transmit based on the same cell identity; and responsive to the determination, trigger a procedure that uses the results of one or more first radio measurements to determine a particular TP that transmits the second radio signal on which the positioning measurement has been or is to be performed, the one or more first radio measurements performed on one or more first radio signals transmitted or received by the TPs.

45. A computer program product stored in a non-transitory computer readable medium for controlling a node in a wireless communication system, the computer program product comprising software instructions which, when run on at least one processing circuit of the node, causes the node to:

obtain results of one or more first radio measurements performed on one or more first radio signals transmitted or received by geographically separated transmission points (TPs) of a shared cell;

determine, using the obtained results and from among the TPs that transmit second radio signals based on the same cell identity, a particular TP that transmits the second radio signal on which a positioning measurement is performed for determining a target wireless communication device's position; and use information related to the determined TP to perform one or more positioning tasks.

46. A computer program product stored in a non-transitory computer readable medium for controlling a wireless communication device in a wireless communication system, the computer program product comprising software instructions which, when run on at least one processing circuit of the wireless communication device, causes the wireless communication device to:

perform a positioning measurement on one of multiple radio signals that geographically separated transmission points (TPs) of a shared cell transmit based on the same cell identity;

determine a particular TP that transmits the radio signal on which the wireless communication device performs the positioning measurement; and associate an identity of the particular TP and the same cell identity with an identity of the wireless communication device and/or a result of the positioning measurement.

47. A computer program product stored in a non-transitory computer readable medium for controlling a node in a wireless communication system, the computer program product comprising software instructions which, when run on at least one processing circuit of the node, causes the node to:

determine that a positioning measurement for determining the position of a target wireless communication device has been or is to be performed in a shared cell on one of multiple second radio signals that geographically separated transmission points (TPs) of the shared cell transmit based on the same cell identity; and responsive to the determination, trigger a procedure that uses the results of one or more first radio measurements to determine the particular TP that transmits the second radio signal on which the positioning measurement has been or is to be performed, the one or more first radio measurements performed on one or more first radio signals transmitted or received by the TPs.

* * * * *